(12) United States Patent
Hashimoto

(10) Patent No.: US 11,144,294 B2
(45) Date of Patent: Oct. 12, 2021

(54) COMMUNICATION SYSTEM, COMMUNICATION METHOD, AND MANAGEMENT APPARATUS

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/677,863

(22) Filed: Nov. 8, 2019

(65) Prior Publication Data

US 2020/0174767 A1     Jun. 4, 2020

(30) Foreign Application Priority Data

Nov. 29, 2018   (JP) .............................. JP2018-223810

(51) Int. Cl.
   *G06F 8/61*      (2018.01)
   *G06F 9/445*     (2018.01)
(52) U.S. Cl.
   CPC ............ *G06F 8/61* (2013.01); *G06F 9/44505* (2013.01)
(58) Field of Classification Search
   CPC ......................... G06F 8/60–71; G06F 9/44505
   USPC .................................................. 717/168–178
   See application file for complete search history.

(56) References Cited

U.S. PATENT DOCUMENTS

| 9,154,365 | B1 * | 10/2015 | Henry ............... | H04L 29/08072 |
| 9,268,737 | B2 * | 2/2016 | Hendry ............... | G06F 15/177 |
| 10,031,774 | B2 * | 7/2018 | Chen ..................... | G06F 9/5027 |

(Continued)

FOREIGN PATENT DOCUMENTS

| JP | 2004-171513 | 6/2004 |
| JP | 2017-157200 | 9/2017 |

OTHER PUBLICATIONS

Golovchinsky, G., et al., DICE: Designing Conference Rooms for Usability, CHI '09: Proceedings of the SIGCHI Conference on Human Factors in Computing Systems, Apr. 2009, pp. 1015-1024, [retrieved on Jul. 9, 2021], Retrieved from the Internet: <URL:http://dl.acm.org/>.*

(Continued)

*Primary Examiner* — Geoffrey R St Leger
(74) *Attorney, Agent, or Firm* — IPUSA, PLLC

(57) ABSTRACT

According to an embodiment, a communication system includes an information processing terminal, and a management apparatus communicable with the information processing terminal via a bidirectional communication apparatus. The information processing terminal includes one or more first processors configured to execute an application installed in the information processing terminal, to transmit, to the management apparatus, communication information which the management apparatus uses to communicate with the information processing terminal, in response to installation of the application in the information processing terminal. The management apparatus includes one or more second processors configured to register in the bidirectional communication apparatus, the communication information received from the information processing terminal. The information processing terminal and the management apparatus bidirectionally communicates via the bidirectional communication apparatus by using the communication information.

11 Claims, 19 Drawing Sheets

(56) References Cited

U.S. PATENT DOCUMENTS

| | | | |
|---|---|---|---|
| 2002/0073162 A1* | 6/2002 | McErlean | H04L 12/1822 709/206 |
| 2006/0117100 A1* | 6/2006 | Ogawa | H04L 67/025 709/223 |
| 2012/0062919 A1 | 3/2012 | Hashimoto | |
| 2012/0066083 A1* | 3/2012 | Inoue | G06Q 30/0601 705/26.1 |
| 2012/0218596 A1 | 8/2012 | Hashimoto | |
| 2012/0224220 A1 | 9/2012 | Toriumi et al. | |
| 2013/0232481 A1* | 9/2013 | Yamashita | G06F 9/445 717/177 |
| 2014/0019859 A1 | 1/2014 | Hashimoto | |
| 2014/0253939 A1 | 9/2014 | Hashimoto | |
| 2014/0280799 A1* | 9/2014 | Hendry | G06F 15/177 709/221 |
| 2014/0333948 A1 | 11/2014 | Hashimoto | |
| 2015/0163368 A1 | 6/2015 | Hashimoto | |
| 2015/0358495 A1 | 12/2015 | Hashimoto | |
| 2016/0085768 A1 | 3/2016 | Hashimoto | |
| 2016/0132314 A1* | 5/2016 | Solsona-Palomar | G06F 9/44505 717/172 |
| 2016/0216975 A1 | 7/2016 | Hashimoto | |
| 2016/0294465 A1* | 10/2016 | Hashimoto | H04W 4/70 |
| 2017/0109199 A1* | 4/2017 | Chen | G06F 9/5027 |
| 2017/0251122 A1 | 8/2017 | Matsushima et al. | |
| 2018/0088883 A1 | 3/2018 | Hashimoto | |
| 2018/0324310 A1 | 11/2018 | Hashimoto | |
| 2019/0012614 A1 | 1/2019 | Yamada et al. | |
| 2019/0281092 A1 | 9/2019 | Yamada et al. | |
| 2019/0303827 A1 | 10/2019 | Hashimoto | |

OTHER PUBLICATIONS

Scott, K., et al., Context-Aware Services for Smart Learning Spaces, IEEE Transactions on Learning Technologies, vol. 3, Issue: 3, Jul.-Sep. 2010, pp. 214-227, [retrieved on Jul. 9, 2021], Retrieved from the Internet: <URL:http://ieeexplore.ieee.org/>.*

Nelis, J., et al., Supporting development and management of smart office applications: a DYAMAND case study, 2015 IFIP/IEEE International Symposium on Integrated Network Management (IM), May 11-15, 2015, pp. 1053-1058, [retrieved on Jul. 9, 2021], Retrieved from the Internet: <URL:http://ieeexplore.ieee.org/>.*

* cited by examiner

FIG. 13

| | MEETING ROOM NAME | MEETING ROOM ID | CONNECTION STATE OF MEETING ROOM TERMINAL | OPERATION GROUP | IMAGE CODE | NUMBER OF TERMINALS THAT CAN BE REGISTERED |
|---|---|---|---|---|---|---|
| ☑ | MEETING ROOM A | K-001 | BEFORE SETUP | GENERAL MEETING ROOM | DISPLAY IMAGE CODE | 1 |
| ☑ | MEETING ROOM B | K-002 | CONNECTED | GENERAL MEETING ROOM | DISPLAY IMAGE CODE | 1 |
| ☑ | MEETING ROOM C | K-003 | CONNECTED | RECEPTION ROOM | DISPLAY IMAGE CODE | 2 |
| ☑ | MEETING ROOM D | K-004 | DISCONNECTED | RECEPTION ROOM | DISPLAY IMAGE CODE | 1 |
| ☐ | MEETING ROOM E | K-005 | BEFORE SETUP | TRAINING ROOM | DISPLAY IMAGE CODE | 3 |
| ☐ | MEETING ROOM F | K-006 | BEFORE SETUP | TRAINING ROOM | DISPLAY IMAGE CODE | 1 |
| ☐ | MEETING ROOM G | K-007 | BEFORE SETUP | GENERAL MEETING ROOM | DISPLAY IMAGE CODE | 2 |

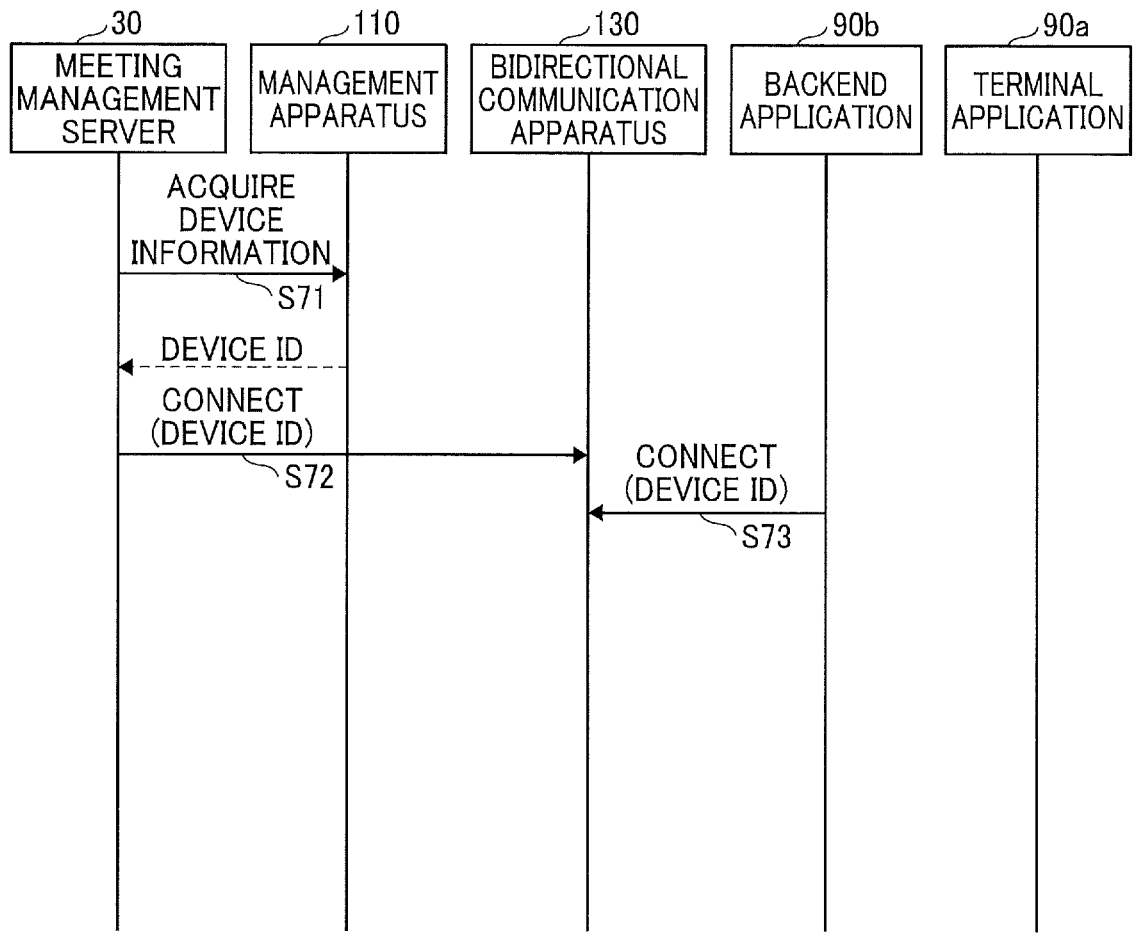

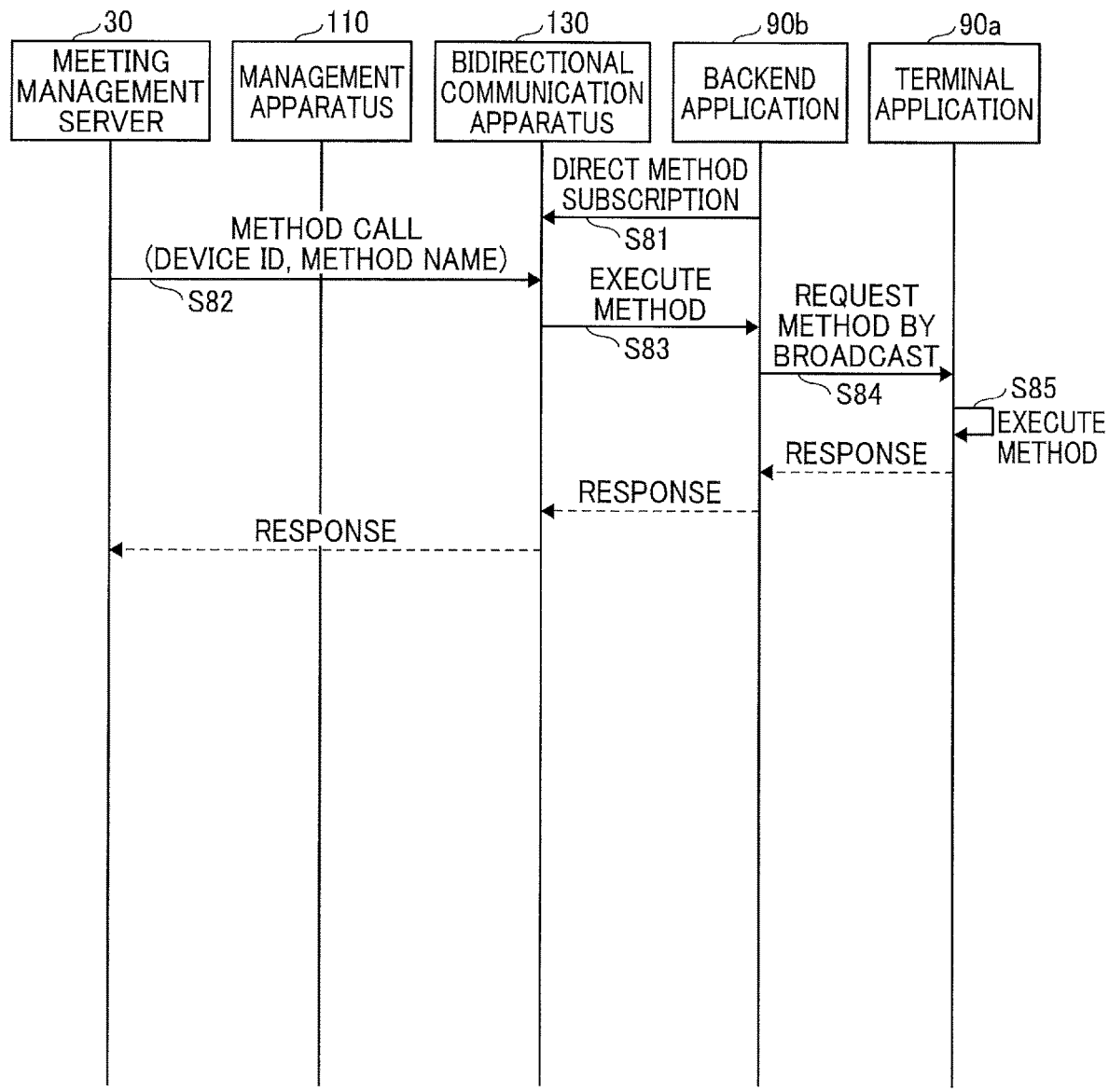

COMMUNICATION SYSTEM, COMMUNICATION METHOD, AND MANAGEMENT APPARATUS

CROSS-REFERENCE TO RELATED APPLICATIONS

This patent application is based on and claims priority pursuant to 35 U.S.C. § 119(a) to Japanese Patent Application No. 2018-223810, filed on Nov. 29, 2018, in the Japan Patent Office, the entire disclosure of which is hereby incorporated by reference herein.

BACKGROUND

Technical Field

The present disclosure relates to a communication system, a communication method, and a management apparatus.

Description of the Related Art

In a system in which plural information processing terminals communicate with an information processing apparatus, an administrator may install programs or configure settings of the programs on each information processing terminal. To reduce the administrator's workload, push-type services are known in which a management apparatus that can manage plural information processing terminals installs programs in the information processing terminals.

SUMMARY

According to an embodiment, a communication system includes an information processing terminal, and a management apparatus communicable with the information processing terminal via a bidirectional communication apparatus. The information processing terminal includes one or more first processors configured to execute an application installed in the information processing terminal, to transmit, to the management apparatus, communication information by using which the management apparatus communicates with the information processing terminal, in response to installation of the application in the information processing terminal The management apparatus includes one or more second processors configured to register, in the bidirectional communication apparatus, the communication information received from the information processing terminal. The information processing terminal and the management apparatus bidirectionally communicates via the bidirectional communication apparatus by using the communication information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is an example of a setting screen that the registration terminal displays by communicating with the meeting management server, according to an embodiment of the present disclosure;

FIG. 17 is a sequence diagram illustrating an example of a procedure by which the backend application and the meeting management server connect via a bidirectional communication apparatus, according to an embodiment of the present disclosure;

FIG. 18 is an example of an association table of a meeting room ID and a device ID stored in the meeting management server, according to an embodiment of the present disclosure;

FIG. 19 is a sequence diagram illustrating an example of a procedure by which the meeting management server causes the terminal application to execute an instruction by a direct method, according to an embodiment of the present disclosure.

Figure 1:
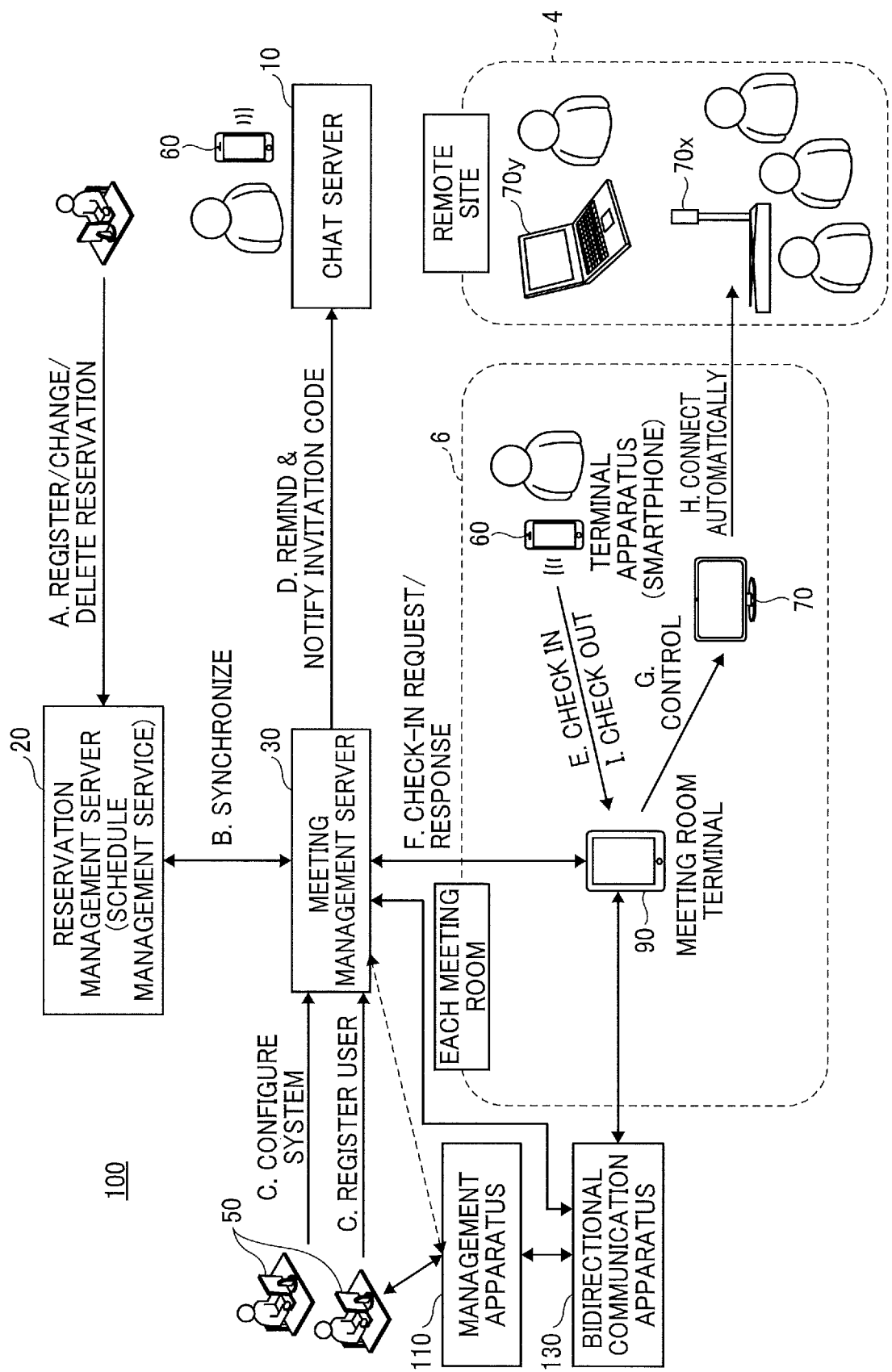
FIG. 1 is a diagram illustrating an overview of an operation performed by a resource reservation system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is now given of a resource reservation system and a communication method performed by the resource reservation system, according to example embodiments of the present disclosure.

Embodiment 1

Outline of the Resource Reservation System:

First, an outline of a reservation system will be described with reference to FIG. 1. FIG. 1 is an example of a diagram explaining an outline of an overall operation of a resource reservation system 100.

A. A user who is to make a reservation operates his/her terminal apparatus 60 to cause the terminal apparatus 60 to communicate with a reservation management server 20 to reserve a meeting room. The reservation management server 20 is implemented by a general-purpose cloud service such as Office365 (registered trademark) and G Suite (registered trademarks). In the reservation management server, meeting rooms of an organization such as a company to which the user who made the reservation belongs are registered.

B. A meeting management server 30 is a server that controls the entire resource reservation system 100 on the basis of a reservation status of the meeting room. The meeting management server 30 communicates with the reservation management server 20 as appropriate to acquire reservation information. Thus, the reservation information is synchronized with the reservation management server 20.

C. An administrator or the like on the organization side, who uses the resource reservation system 100 can register users and perform various settings to the meeting management server 30. User registration means registering, in the meeting management server 30, an ID, a mail address, and the like for identifying an individual user of the resource reservation system 100. For example, the user registration means registering a user who is subject to various notifications using a chat server 10 (slack, Line, Microsoft Teams (which are all registered trademarks), etc.). In addition, since the notification is made via a bot that transmits a message as the meeting management server 30, the bot provided by the chat server is also registered. The bot is a program to provide the user with an interface that accepts various notifications and inputs on behalf of the resource reservation system or the meeting management server on each chat application (a terminal application of a chat system) in a terminal such as a smartphone possessed by each user. The bot is a program on the chat server 10 and makes a notification, accepts an input, provides various guidance, and the like while communicating with the user (user of the resource reservation system) as a virtual chat partner. As an example, the resource reservation system notifies the user of a reservation information reminder, and the bot is a system contact window that accepts, as a chat, a user input such as meeting participation or non-participation for that reminder. Various settings are registration of a meeting room terminal 90, setting of a reminding timing, and the like.

D. When the current time is a predetermined time period before the start time of a meeting defined in the reservation information, the meeting management server 30 sends a reminder of the scheduled meeting to the user who made the reservation, thereby reducing an empty reservation of a meeting room. The "empty reservation" refers to reserving resources such as a meeting room that is not actually used. In addition, the meeting management server 30 notifies the user of an invitation code (invitation to a group) according to need. In response to receiving the reminder, the user who made the reservation stores information (meeting identification information) for checking in the meeting room in the terminal apparatus 60. The "check-in" or "checking in" refers to a user's input of an instruction for check-in for starting use of the meeting room, and by the meeting management server 30, receiving information indicating the check-in in response to the check-in instruction to perform a process of setting a flag indicating the start of use of the meeting room.

E. In each meeting room 6, the meeting room terminal 90 is provided, and the meeting room terminal 90 regularly downloads the reservation information for a meeting held in this meeting room. The meeting room terminal 90 can display a schedule of a current meeting or a most recent meeting, or the like, and allow a meeting participant to check the schedule. A little before a meeting start time, the user who made the reservation for the meeting room enters the meeting room 6 and checks in. For example, the meeting identification information is input to the meeting room terminal 90, or the terminal apparatus 60 is held over the meeting room terminal 90 (the user presses a check-in button (a use start button) displayed by a terminal application 90a of the meeting room terminal 90, that allows the meeting identification information to be read or communicated).

F. The meeting room terminal 90 transmits a check-in request to the meeting management server 30. Thus, if the meeting identification information can be authenticated, the meeting room terminal 90 receives a response from the meeting management server 30 that the check-in has been completed. The meeting room terminal 90 displays that the meeting room is in use (the meeting is being held). If a use start notification that notifies the check-in by the time determined for the meeting start time is not confirmed, the meeting management server 30 cancels the reservation of the meeting room 6 (cancels the reservation information when the use of the meeting room is not started for a predetermined time), and transmits "Cancelled" to the meeting room terminal 90 as a status included in the reservation information. In this case, the meeting room terminal 90 displays that the meeting room is vacant, and thus any user can use the meeting room 6.

G. The meeting room terminal 90 controls an electronic device 70 in response to a request from the meeting management server 30. For example, the electronic device 70 is turned on at a meeting start time and turned off at a meeting end time. In this way, convenience when operating the electronic device 70 by the meeting participant can be improved.

H. If the electronic device 70 includes a teleconference function, for example, the electronic device 70 can communicate with an electronic device (teleconference terminal 70x, etc.) at a remote site 4 and conduct a meeting with the remote site. A PC 70y on which an application operates can also communicate with the electronic device 70. The reservation information includes destination information (a communication ID of a destination) indicating the remote site 4 in advance, and the electronic device 70 can automatically communicate with the teleconference terminal 70x and the PC 70y.

I. When the user who made the reservation ends the meeting, the user presses a button of the meeting room terminal 90 to check out. The meeting room terminal 90 displays the next reservation status, thereby allowing an arbitrary user to check the reservation status of the meeting room.

J. In addition, a management apparatus 110 (an example of management means) and a bidirectional communication apparatus 130 (an example of bidirectional communication means) are arranged on the network. The management apparatus 110 is communicably connected to the meeting room terminal 90 via the bidirectional communication apparatus 130. The bidirectional communication apparatus 130 is a communication device that relays communication from the meeting room terminal 90 to the management apparatus 110 and relays communication from the management apparatus 110 to the meeting room terminal 90. The administrator can connect to the management apparatus 110 from a registration terminal 50, receive various settings from the meeting room terminal 90, and transmit various settings to the meeting room terminal 90. In addition, the management apparatus 110 is also communicably connected to the meeting management server 30, and the meeting management server 30 can also be connected to the meeting room terminal 90.

Figure 2:
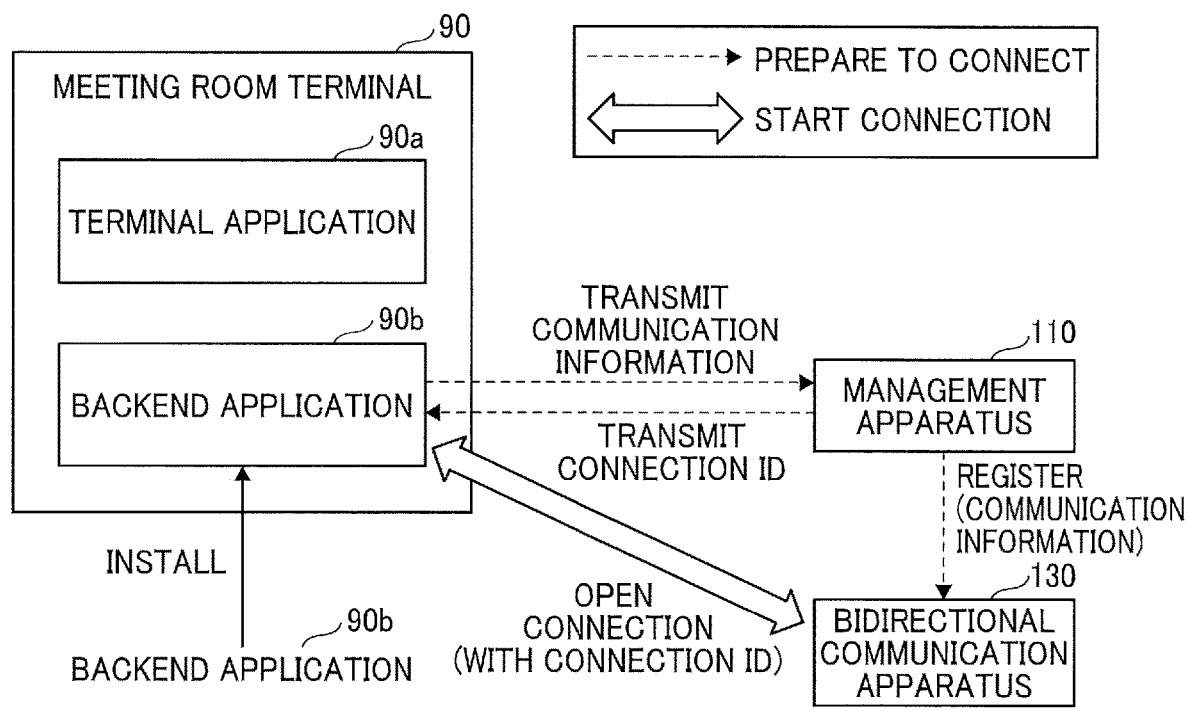
FIG. 2 is a schematic diagram for describing an overview of operation performed by a meeting room terminal, according to an embodiment of the present disclosure.

Outline of Operation:

FIG. 2 is an example of a diagram explaining an outline of an operation of the meeting room terminal 90 of this embodiment. One of the features of this embodiment is that, triggered by installation of a backend application 99b in the meeting room terminal 90, the backend application 90b transmits, to the management apparatus 110, communication information (a device ID, which will be described later) by using which the management apparatus 110 communicates with the backend application 90b via the bidirectional communication apparatus 130. The management apparatus 110 transmits, to the backend application 90b, a connection ID for authenticating the backend application 90b. The management apparatus registers the communication information in the bidirectional communication apparatus 130.

The backend application 90b and the management apparatus 110 can communicate bidirectionally via the bidirectional communication apparatus 130. In addition, the backend application 90b is an application in which the meeting room terminal 90 communicates with, the terminal application 90a that fulfills a function as the meeting room terminal 90, within the meeting room terminal 90. Therefore, the backend application 90b plays a role of relaying bidirectional communication between the terminal application 90a and the management apparatus 110. Thus, it is possible to operate the terminal application 90a from the management apparatus 110. In addition, it is also possible to operate the terminal application 90a from the meeting management server 30.

Terms:

The communication system is a system in which the management apparatus communicates bidirectionally with the meeting room terminal 90 via the bidirectional communication apparatus. In this embodiment, a description is given of an example in which the communication system is configured as a resource reservation system.

The terms "in response to" refers to being triggered by. In this embodiment, the meeting room terminal 90 automatically starts registration in response to the installation of an application.

The communication information is information by using which the management apparatus communicates with the information processing terminal, and is described with the term, device ID, in this embodiment. The communication information may further include other information.

Figure 3:
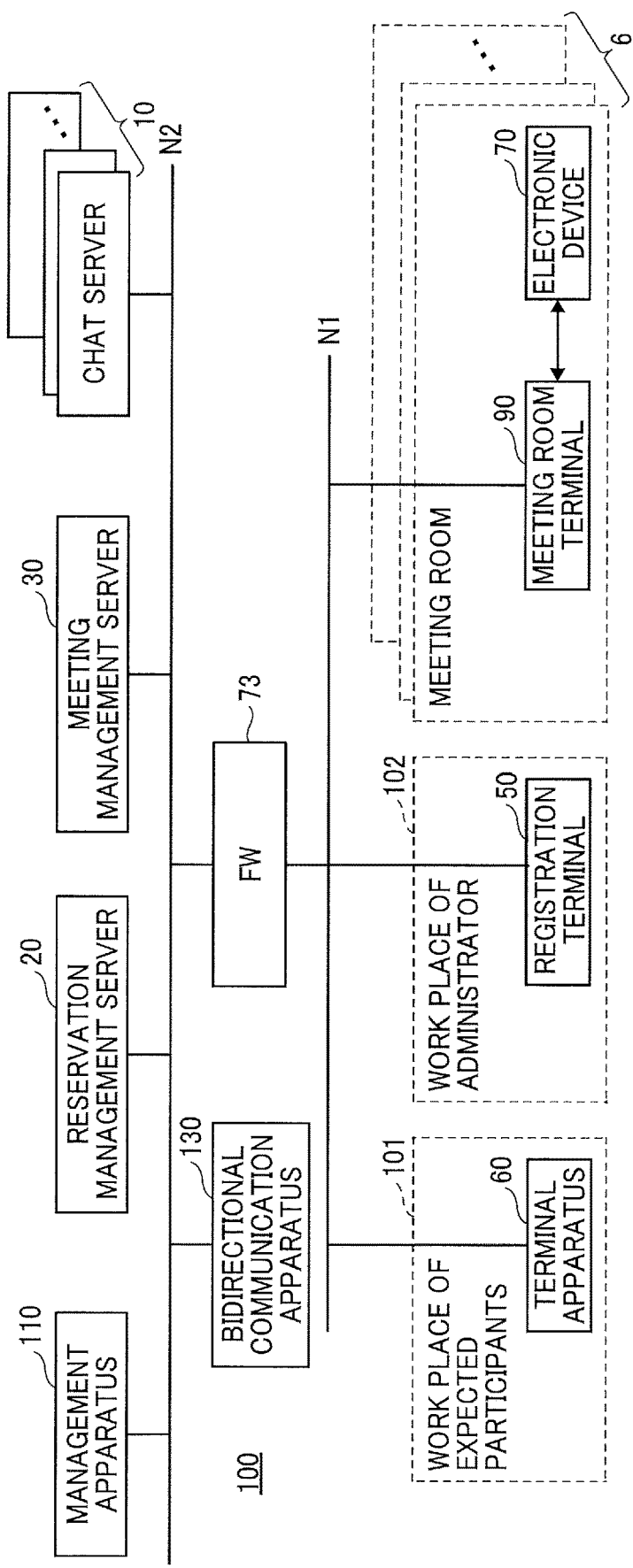
FIG. 3 is a schematic diagram illustrating an example of a system configuration of the resource reservation system, according to an embodiment of the present disclosure.

System Configuration Example:

FIG. 3 is a system configuration diagram of an example of a resource reservation system 100. The resource reservation system 100 can be mainly divided into an external network N2 and an internal network N1. The internal network N1 is a network (on-premise) inside a firewall 73. The external network N2 is a network such as the Internet through which an unspecified number of communications are transmitted.

The external network N2 is connected to the reservation management server 20, the meeting management server 30, one or more chat servers 10, and the bidirectional communication apparatus 130 that communicates with the management apparatus 110. Each server can communicate according to need. The terminal apparatus 60 operated by a meeting participant may be connected to the external network N2 according to need.

The reservation management server 20 is constructed by one or more information processing apparatuses (computer system) equipped with a general server operating system (OS). A system for reservation of equipment provided by the reservation management server 20 is called a reservation management system. The reservation management server 20 includes a calendar system and provides a Web application that manages various schedules. Specifically, for example, the calendar system includes the following functions.

Receive schedule registration, and enable a user who made a reservation to confirm the reservation arbitrarily.

Notify by e-mail at a set date and time, such as 30 minutes before the schedule.

One person can manage the schedule with multiple calendars (for work, home use, etc.).

Share calendars with people in the same group

The reservation management server 20 manages a user with an account. The account is the right that the user uses a service. In many systems, a user uses the account to log in to the systems. For this reason, the account includes a function (identification information function) that allows the system to uniquely identify the user. In this embodiment, the reservation management server 20 transmits the reservation information of an account (domain) registered in advance to the meeting management server 30. Alternatively, the meeting management server 30 can specify the account of the reservation management server 20 and request the reservation information to acquire the reservation information of the meeting room 6 from the reservation management server 20. The account may be any information that can uniquely identify the user, such as an e-mail, an ID, and a telephone number.

In this embodiment, the reservation of the meeting room 6 is managed as a schedule; however, the reservation management server 20 can manage various schedules, not limited to the schedule of the meeting room 6. In addition to the meeting room 6, the reservation management server 20 can be used to reserve various facilities, such as various electronic devices rentals and parking reservations, and such as rental offices, rental studios, rental cycles, rental cars, accommodations such as hotels, rental spaces such event venue/locker.

G Suite (registered trademark), Office365 (registered trademark), and the like are known as the reservation management server 20 and the reservation management system including the reservation management server 20. However, any reservation management system including the functions described in this embodiment may be used.

In addition, in this embodiment, information regarding the meeting room 6 of the internal network N1 is registered in advance in the reservation management server 20. That is, the Web application of the reservation management server 20 is customized according to a meeting room name, a meeting room ID, an available reservation time of each meeting room 6 in the internal network of the company that uses the resource reservation system 100, a reservation unit, capacity of each meeting room 6, and the like. Therefore, the reservation information is linked with the meeting room 6 of the company that uses the resource reservation system 100.

The chat server 10 can be constructed by one or more information processing apparatuses (computer system) equipped with a general server OS. A real-time system that shares information such as text, voice, and video for a plurality of users in the chat server 10 is called a chat system. The chat server 10 notifies the terminal apparatus 60 of the information regarding the reservation of the meeting room 6. In this embodiment, a plurality of chat servers 10 with different operating entities may be included.

The information to be shared includes images, voice, and the like, and is not limited to text. In this embodiment, for convenience of explanation, it is assumed that text is mainly used for notification. For example, the chat system may provide a voice call function between groups. One-to-one or one-to-N (≥2) may be used for the voice call. Therefore, in this embodiment, when the chat system notifies the information regarding the reservation of the meeting room 6, a voice message output may be used in addition to the display of text. Known chat systems include LINE (registered trademark; hereinafter omitted), slack (registered trademark), Microsoft Teams (registered trademark; hereinafter omitted) and the like. However, any chat system that can notify one or more users from a bot (a program that executes a predetermined process) may be used.

While the chat server 10 also manages a user with an account (different from the reservation management server 20 account), in principle, the meeting management server 30 does not need to be aware of the account of the chat server 10. However, the meeting management server 30 can specify any account of the chat server 10 to make notification.

The meeting management server 30 can be constructed by one or more information processing apparatuses (computer system) equipped with a general server OS. As a process relating to the external network N2, the meeting management server 30 acquires the reservation information of the meeting room 6 from the reservation management server 20. Further, the meeting management server 30 acquires an expected participant set in the reservation information and transmits a notification to the group of the chat server 10 (or to an individual user such as a user who made the reservation) associated with the acquired expected participant at a preset time. In addition, as a process related to the internal network N1, a check-in and a check-out to the meeting room 6 are managed, and a power supply of the electronic device 70 is controlled on the basis of the reservation information of the meeting room 6 acquired from the reservation management server 20.

The management apparatus 110 is an information processing apparatus that provides the registration terminal 50 with a Web application that accepts various settings for the meeting room terminal 90 from an administrator. The management apparatus 110 generates screen information for accepting various settings of the meeting room terminal 90 as a so-called Web server is and transmits the screen information to the registration terminal 50. In one example, the management apparatus 110 can be implemented by a single computer or information processing apparatus. In another example, the management apparatus 110 is implemented by a plurality of servers to which divided functions or storages are arbitrarily allocated. In still another example, the management apparatus 110 can be configured as functions provided by a cloud platform.

In addition, the bidirectional communication apparatus 130 is an information processing apparatus that provides a bidirectional communication service between an information processing apparatus on a cloud and an information processing apparatus in a firewall (information processing apparatus in the office of on-premise). With the bidirectional communication apparatus 130, the management apparatus 110 or the meeting management server 30 can communicate with the meeting room terminal 90 inside the firewall. For example, while Azure IoT Hub (registered trademark) is known as the bidirectional communication apparatus 130, the bidirectional communication apparatus 130 may be another apparatus. In one example, the bidirectional communication apparatus 130 can be implemented by a single computer or information processing apparatus. In another example, the bidirectional communication apparatus 130 is implemented by a plurality of servers to which divided functions or storages are arbitrarily allocated. In still another example, the bidirectional communication apparatus 130 can be configured as functions provided by a cloud platform.

The internal network N1 includes the meeting room 6, a work place 101 for the expected participants, and a work place 102 for the administrator. The expected participants can access outside the external network N2 from each site via the internal network N1. The internal network N1 is, for example, a local area network (LAN). The meeting room 6, the work place 101 of the expected participants, and the work place 102 of the administrator are not limited to LANs in the same company.

In the meeting room 6, the meeting room terminal 90 and the electronic device 70 are located. The meeting room terminal 90 and the electronic device 70 can communicate with each other via a small LAN or a dedicated line. The electronic device can be connected to the internal network N1 and the external network N2 without going through the meeting room terminal 90. The meeting room terminal 90 and the electronic device 70 may communicate either wirelessly or wired. Since the internal network N1 is inside the firewall 73, direct communication from the external network N2 to the internal network N1 is difficult.

The meeting room terminal 90 is an information processing terminal operated by a meeting participant who uses the meeting room 6, such as the user who made the reservation for the meeting room 6. For example, the meeting room terminal 90 is provided on a desk of the meeting room 6, or at the entrance of the meeting room 6. A plurality of meeting room terminals 90 may be provided in one meeting room 6. The meeting room terminal 90 can be constructed by one or more information processing apparatuses (computer system) equipped with a general OS.

The meeting room terminal 90 transmits the meeting room ID to the meeting management server 30, and displays the reservation information of the meeting room 6 on a current day. In addition, the meeting room terminal 90 periodically requests the reservation information and acquires the changed reservation information. Moreover, the meeting room terminal 90 acquires control information such as power ON/OFF of the electronic device 70 from the meeting management server 30. With this, the meeting room terminal 90 turns the electronic device 70 ON and OFF.

In addition, the meeting room terminal 90 displays a standby screen for check-in, check-out, or the like, and communicates with the meeting management server 30 to notify the meeting management server 30 of the check-in or check-out. At the check-in, since the meeting room terminal 90 transmits, to the meeting management server 30, the meeting identification information input from the user who made the reservation and the meeting room ID held in advance, the meeting management server 30 can confirm that, the user who made the reservation for the meeting room 6 uses the meeting room 6, with the use of the meeting identification information and the meeting room ID.

The electronic device 70 is a piece of various office equipment that can be used in the meeting room 6, and is, for example, an electronic whiteboard, a multifunction device, a projector, a digital signage, a digital camera, or the like. The electronic whiteboard includes a large display with a touch panel, and detects coordinates of a board surface instructed by a user and connects the coordinates to display a stroke. In addition to this, the electronic whiteboard can display an image of a connected PC and communicate with the electronic whiteboard at a remote site to synchronize the stroke. In addition, the electronic whiteboard is sometimes called an electronic information board.

The multifunction device includes functions such as a copy machine, a scanner, a printer, and a fax transmission/reception, and is used for printing, copying, digitizing, transmitting, and the like of a material during a meeting. The projector is an apparatus that projects an image. For example, the terminal apparatus 60 projects, an image displayed on a display, on a screen or the like, thereby allowing participants to share the projected image. The digital signage is a large display that is used to display any still image or video. The digital camera is used for each participant to capture and store a paper material and a material displayed on the electronic whiteboard.

The terminal apparatus 60 that can be connected to the internal network N1 is provided in the work place 101 of the expected participant. The terminal apparatus 60 may communicate by wire or wirelessly. The terminal apparatus 60 is an information processing apparatus used when the expected participant (including a user who makes a reservation) reserves a meeting room. The expected participant (including the user who makes a reservation) can also use the terminal apparatus 60 in the meeting room. The terminal apparatus 60 is an information processing apparatus carried by the expected participant.

The terminal apparatus 60 can be constructed by one or more information processing apparatuses (computer system) equipped with a general OS. The terminal apparatus 60 is, for example, a smart phone, a tablet terminal, a personal computer (PC), a personal digital assistant (PDA), a wearable PC (sunglasses type, wristwatch type, etc.), or the like. However, the terminal apparatus 60 is required to include a communication function and to operate browser software and application software dedicated to the chat server 10 and the reservation management server 20. For example, a car navigation, a game machine, a television receiver, or the like can be the terminal apparatus 60.

In the terminal apparatus 60, application software dedicated to the chat server 10 (hereinafter referred to as a chat application) operates, and further, application software dedicated to the resource reservation system 100 (hereinafter referred to as a meeting application) operates. These may be substituted with browser software.

The registration terminal 50 that can be connected to the internal network N1 is provided in the work place 102 of the administrator. The registration terminal 50 may communicate by wire or wirelessly. The registration terminal 50 is a terminal for making various settings on the meeting management server 30.

The registration terminal 50 may be the same information processing apparatus as the terminal apparatus 60. However, since the administrator mainly uses the meeting management server 30 to set the information, there is no need to have the chat application or the meeting application. The registration terminal 50 communicates with the meeting management server 30 mainly by browser software, and displays a Web page.

Figure 4:
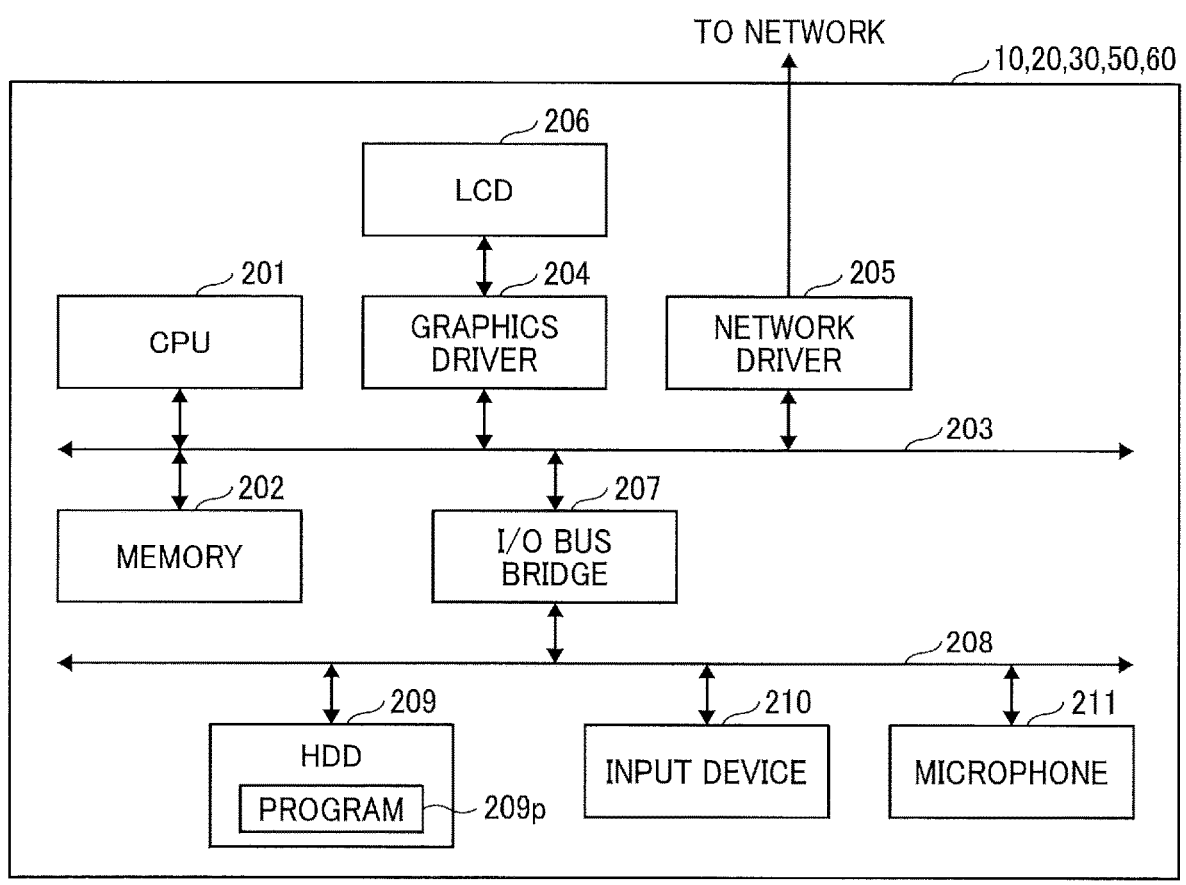
FIG. 4 is a block diagram illustrating an example of a hardware configuration of a meeting management server, according to an embodiment of the present disclosure.

Hardware Configuration:

Hardware Configuration of Meeting Management Server:

FIG. 4 is a hardware configuration diagram of an example of the meeting management server 30. FIG. 4 is an example of a schematic hardware configuration diagram of the meeting management server 30. The meeting management server 30 includes a central processing unit (CPU) 201 and a memory 202 that enables high-speed access to data used by the CPU 201. The CPU 201 and the memory 202 are connected to other devices or drivers, for example, a graphics driver 204 and a network driver (NIC) 205 of the meeting management server 30 via a system bus 203.

The graphics driver 204 is connected to an LCD (display device, an example of the display) 206 via a bus and monitors a process result of the CPU 201. In addition, the network driver 205 connects the meeting management server 30 to the external network N2 at the transport layer level and the physical layer level to establish a session with other devices.

An input/output (I/O) bus bridge 207 is further connected to the system bus 203. On the downstream side of the I/O bus bridge 207, a storage device such as a hard disk drive (HDD) 209 is connected by IDE, ATA, ATAP8OI, Serial ATA, SCSI, USB, or the like via an I/O bus 208 such as peripheral component interconnect (PCI). The HDD 209 stores a program 209$p$ that controls the entire meeting management server 30. The HDD 209 may be a solid state drive (SSD). The Program 209$p$ may be distributed in a state of being stored in a storage medium, or may be distributed from a program distribution server.

In addition, the I/O bus 208 is connected to an input device 210 such as a keyboard and a mouse (called a pointing device) via a bus such as a USB, and accepts an input and an instruction from an operator such as a system administrator.

The illustrated hardware configuration of the meeting management server 30 illustrates hardware elements that are preferably included in the meeting management server 30.

The hardware configuration diagram of the reservation management server 20, chat server 10, registration terminal 50, terminal apparatus 60, management apparatus 110, and bidirectional communication apparatus 130 may be the same as the hardware configuration of the meeting management server 30. Or even if different from the hardware configuration of the meeting management server 30, it is assumed that there is no problem in explaining the resource reservation system 100 of this embodiment. In addition, since the meeting management server 30, the reservation management server 20, and the chat server 10 correspond to cloud computing, these hardware configurations may be configured by dynamically connecting and disconnecting hard resources according to a load. The cloud computing is a form of usage in which resources on a network are used without being conscious of a specific hardware resource.

Figure 5:
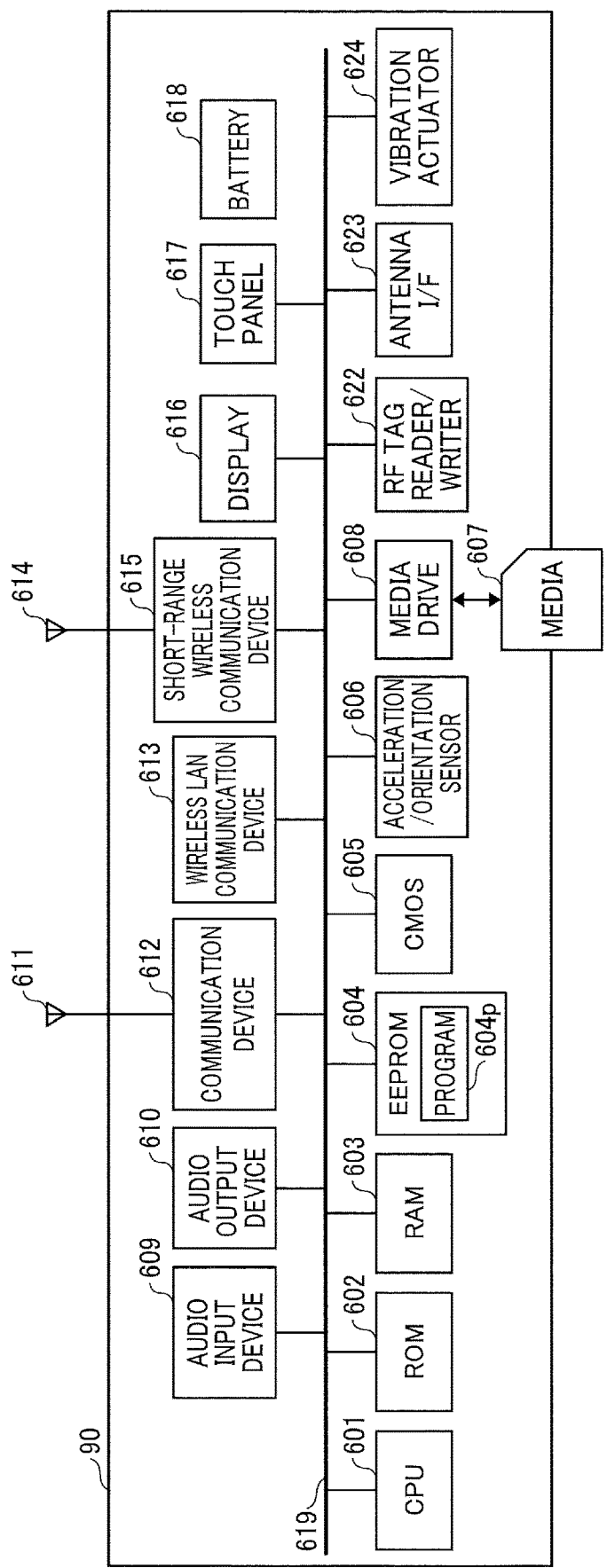
FIG. 5 is a block diagram illustrating an example of a hardware configuration of the meeting room terminal, according to an embodiment of the present disclosure.

Meeting Room Terminal:

FIG. 5 is a hardware configuration diagram of an example of the meeting room terminal 90. The meeting room terminal 90 in FIG. 5 is assumed to be a tablet device. The meeting room terminal 90 includes a CPU 601, a read only memory (ROM) 602, a random access memory (RAM) 603, an electrically erasable programmable read only memory (EEPROM) 604, a complementary metal-oxide semiconductor (CMOS) sensor 605, an acceleration/orientation sensor 606, and a media drive 608.

The CPU 601 controls the overall operation of the meeting room terminal 90. The ROM 602 stores basic input/output programs. The RAM 603 is used as a work area for the CPU 601. The EEPROM 604 reads out or writes data according to the control of the CPU 601. The CMOS sensor 605 captures a subject and obtains image data according to the control of the CPU 601. The acceleration/orientation sensor 606 is an electromagnetic compass that detects geomagnetism, a gyrocompass, an acceleration sensor, or the like.

The media drive 608 controls the reading or writing (memory) of data to the media 607 such as a flash memory. The media drive 608 has a configuration in which the media 607 in which recorded data is read or data is newly written and stored can be freely attached and detached.

A program 604p executed by the CPU 601 is stored in the EEPROM 604. The program 604p is application software, an OS, or the like for executing various processes in the embodiment. The program 604p may be distributed in a state of being stored in the media 607 or may be distributed from a program distribution server.

In addition, the CMOS sensor 605 is a charge coupled device that converts light into electric charge and digitizes a subject image. As long as the CMOS sensor 605 can capture the subject, for example, the CMOS sensor 605 may be a charge coupled device (CCD) sensor. The CMOS sensor 605 can read bar codes and 2D bar codes.

Moreover, the meeting room terminal 90 includes a radio frequency (RF) tag reader/writer 622, an antenna I/F 623, and a vibration actuator 624. The RE tag reader/writer 622 communicates according to a standard such as near field communication (NFC).

The vibration actuator 624 is a motor that vibrates the meeting room terminal 90. For example, when the end time of a meeting is approaching, the meeting room terminal 90 vibrates and can notify the participant accordingly.

Furthermore, the meeting room terminal 90 includes an audio input device 609, an audio output device 610, an antenna 611, a communication device 612, a wireless LAN communication device 613, a short-range wireless communication antenna 614, a short-range wireless communication device 615, a display 616, a touch panel 617, and a bus line 619.

The audio input device 609 converts voice into a voice signal. The audio output device 610 converts the voice signal into voice. The communication device 612 uses the antenna 611 to communicate with a nearest base station apparatus with the use of a wireless communication signal. The wireless LAN communication device 613 performs wireless LAN communication conforming to the IEEE802.11 standard.

The short-range wireless communication device 615 is a communication device according to the communication standard of Bluetooth (registered trademark) or Bluetooth Low Energy (registered trademark) using the short-range wireless communication antenna 614.

The display 616 is a liquid crystal display or an organic EL display that displays the image of a subject, various icons, and the like. The touch panel 617 is mounted on the display 616, includes a pressure-sensitive or electrostatic panel, and detects a touch position on the display 616 by touching with a finger or a touch pen. The bus line 619 is an address bus or a data bus for electrically connecting the above-described each part.

In addition, the meeting room terminal 90 includes a dedicated battery 618 and can be driven by either the battery 618 or a commercial power supply. The audio input device 609 includes a microphone that inputs voice. The audio output device 610 includes a speaker that outputs voice.

Figure 6:
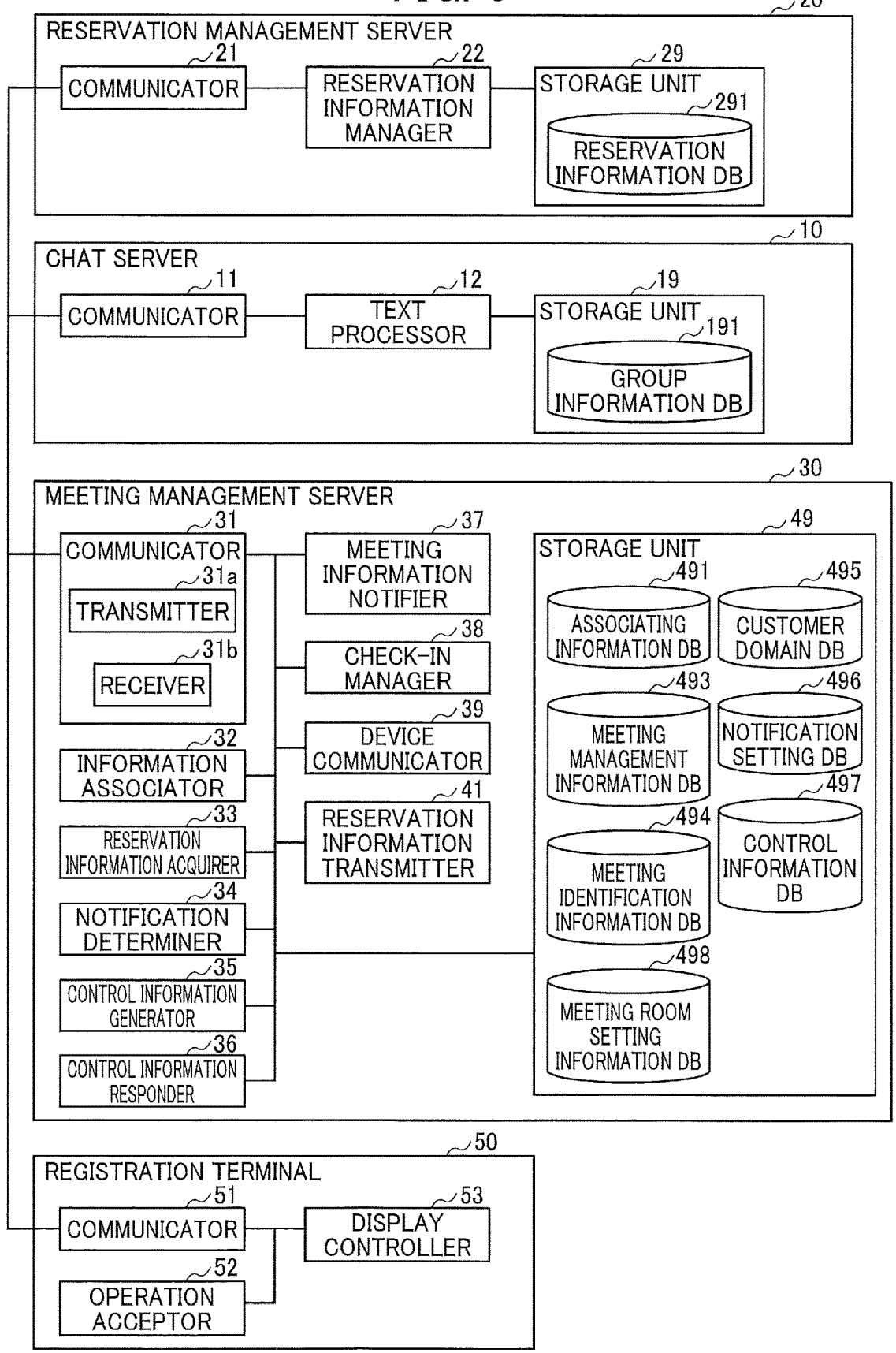
FIG. 6 is a block diagram illustrating functional configurations of a reservation management server, a chat server, the meeting management server, and a registration terminal.

Functions:

FIG. 6 is an example functional block diagram illustrating functions of the reservation management server 20, chat server 10, meeting management server 30, and registration terminal 50 in a block form.

Reservation Management Server:

The reservation management server 20 includes a communicator 21 and a reservation information manager 22. These functional units of the reservation management server 20 are functions or means that are implemented by operating one or more hardware components illustrated in FIG. 4 in cooperation with instructions of the CPU 201 according to the program 209p loaded from the HDD 209 to the memory 202.

The communicator 21 transmits and receives various information to/from the meeting management server 30 and the terminal apparatus 60. The communicator 21 transmits the screen information of the reservation setting screen to the terminal apparatus 60 and receives the reservation setting from the terminal apparatus 60. In addition, the communicator 21 transmits the reservation information to the meeting management server 30.

The reservation information manager 22 is a general Web server (Web application) that accepts the reservation information, and also manages the reservation information registered by the user. When the reservation information is registered (or changed), the reservation information manager 22 notifies an account of the user who made the reservation to the meeting management server 30, and transmits the reservation information to the meeting management server 30 via the communicator 21 in response to a request specifying the account from the meeting management server 30. Even if there is no request, the changed reservation information may be transmitted to the meeting management server 30. A general-purpose web application can be used to enable a user who is make a reservation to register a reservation for the meeting room 6 in the reservation management server 20.

The reservation management server 20 includes a storage unit 29. The storage unit 29 is achieved by the memory 202, the HDD 209, or the like in FIG. 4. The storage unit 29 stores a reservation information database (DB) 291.

mation for identifying one record of the reservation information. The ID is an abbreviation for identification, meaning identifier and identification information. The ID is a name, code, character string, numeric value, or a combination of one or more of these used to uniquely distinguish a specific object from multiple objects. The same applies to IDs other than the reservation ID. The account of the reservation-making user is an account of an expected participant who made a reservation for the meeting room 6. The meeting name is the name of the meeting arbitrarily given by the expected participant. The meeting room ID is identification information for identifying the meeting room 6 in the internal network. The start time is the start of a time zone at which the meeting room 6 is reserved (a time when the meeting starts), and the end time is the end of the time zone at which the meeting room 6 is reserved (a time when the meeting ends). The account of the expected participant is the account of the expected participant who is scheduled to participate in the meeting. All the accounts in Table 1 are issued by the reservation management server 20.

Chat Server:

The chat server 10 includes a communicator 11 and a text processor 12. These functional units of the chat server 10 are functions or means that are implemented by operating one or more hardware components illustrated in FIG. 4 in cooperation with instructions of the CPU 201 according to the program 209p loaded from the HDD 209 to the memory 202.

The communicator 11 transmits and receives various information to/from the meeting management server 30. In this embodiment, the communicator 11 receives, from the meeting management server 30, information regarding a meeting room reservation, information for identifying the bot (for example, a token, etc.), and information for specifying a group to be notified. The information for identifying this bot is notified in advance as information for identifying the bot from the chat server 10 when the bot of the meeting management server 30 is created. Further, the communicator 11 may receive information specifying an account of an individual such as a user who made the reservation. In addition, the communicator 11 transmits, to the meeting management server 30, that the expected participant has already read the information regarding the meeting room

TABLE 1

Reservation Information DB:

| Reservation ID | Account of reservation-making user | Meeting name | Meeting ID | Start time | End time | Accounts of expected participants |
|---|---|---|---|---|---|---|
| 001 | a@xfood.com | Product Z development meeting | K-001 | 2017 Jul. 7 10:00 | 2017 Jul. 7 12:00 | b@xfood.com c@xfood.com d@xfood.com |
| 002 | e@xfood.com | Product Y development meeting | K-001 | 2017 Jul. 7 13:00 | 2017 Jul. 7 14:00 | f@xfood.com g@xfood.com |
| ... | ... | ... | ... | ... | ... | ... |

Table 1 illustrates an example of the reservation information stored in the reservation information DB 291. The reservation information is information for managing the reservation status of the meeting room 6. In the reservation information, each item of a reservation account, a meeting name, a meeting room ID, a start time, an end time, and an expected participant account is registered in association with a reservation ID. The reservation ID is identification inforreservation, or the expected participant's response to the displayed information regarding the meeting room reservation.

The text processor 12 transmits, as information that the bot speaks, the information regarding the reservation of the meeting room 6, to the expected participants belonging to the group, on the basis of the information for identifying the bot and the information for specifying the group to be notified, that are notified from the meeting management server 30. In one example, the number of notifications transmitted by the text processor 12 is equal to the number of the expected participants. In another example, the notification is transmitted only to the user who made the reservation or only to user(s) registered as a notification destination.

The text processor 12 can perform a so-called push notification. For the push notification, a known mechanism provided by each OS is used.

In addition, the chat server 10 includes a storage unit 19. The storage unit 19 is achieved by the memory 202, the HDD 209, or the like of FIG. 4. The storage unit 19 stores a group information DB 191.

TABLE 2

Group Information DB:

| Workspace | Channel | Member Account 1 | Member Account 2 | Member Account 3 | Member Account 4 | Bot account |
|---|---|---|---|---|---|---|
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| ... | ... | ... | ... | ... | ... | ... |

Table 2 illustrates an example of the group information stored in the group info nation DB 191. The group information is information in which the accounts of members belonging to the same group are registered. In the group information, member accounts 1 to n (n=4 in Table 2) and the bot account are registered in association with a work space and a channel.

The work space is identification information for identifying an organization such as a company or a department. In this embodiment, a plurality of members belong to the work space (for example, a company A). The work space is a uniform resource locator (URL), for example, and required to be unique. Moreover, the work space includes a plurality of channels according to the purpose of a chat. The channel is a group of members whose common information is exchanged, such as a group for a product A and a group for a product B, for example. Any member within the members belonging to the work space belongs to the channel In other words, the notification destination is specified by the work space and the channel. However, since the method for specifying the notification destination varies depending on the chat system, if there is identification information that can uniquely identify the group, the notification destination may be specified by that information alone or three or more pieces of information.

The channel is guaranteed uniqueness. The member accounts 1 to n are channel member accounts, which are issued by the chat server 10. In this embodiment, the bot is registered as a member to notify the information regarding the reservation of the meeting room 6. The bot can be called an agent of the meeting management server 30 or a fictitious member. The utterance (text) of the bot is transmitted to the terminal apparatus 60 of the member accounts 1 to n.

The work space and channel are managed by the meeting management server 30 and serve as information for identifying the group to which the participant belongs.

Meeting Management Server:

The meeting management server 30 includes a communicator 31, an information associator 32, a reservation information acquirer 33, a notification determiner 34, a control information generator 35, a control information responder 36, a meeting information notifier 37, a check-in manager 38, a device communicator 39, and a reservation information transmitter 41. These functional units of the meeting management server 30 are functions or means that are implemented by operating one or more hardware components illustrated in FIG. 4 in cooperation with instructions of the CPU 201 according to the program 209*p* loaded from the HDD 209 to the memory 202. This program 209*p* is distributed from a program distribution server or distributed in a state of being stored in a storage medium.

The communicator 31 transmits and receives various information to/from the reservation management server 20, the chat server 10, the registration terminal 50, and the terminal apparatus 60. The communicator 31 includes a transmitter 31*a* and a receiver 31*b*. The receiver 31*b* receives the reservation information from the reservation management server 20, and receives a request for the reservation information from the meeting room terminal 90. In addition, the receiver 31*b* receives a check-in request from the meeting room terminal 90. Moreover, the receiver 31*b* accepts an association between the group of the chat system and the account from the registration terminal 50 operated by the administrator. The transmitter 31*a* transmits the information regarding the meeting room reservation to the chat server 10 and the reservation information to the meeting room terminal 90. The communicator 31 performs bidirectional communication with the bidirectional communication apparatus 130.

The information associator 32 mainly performs a process related to a prior registration work. That is, the information associator 32 accepts the registration of a domain from the registration terminal 50 or the like operated by the administrator, and registers the domain in a customer domain DB 495. The work space and channel of the chat system transmitted from the registration terminal 50 or the like are associated with the account of the reservation management server 20 and registered in an associating information DB 491.

The reservation information acquirer 33 specifies the account of a customer who uses the resource reservation system 100, acquires the reservation information from the reservation management server 20, and registers the reservation information as the meeting management information in a meeting management information DB 493. The reservation information acquirer 33 may specify the account of registered or updated reservation information notified from the reservation management server 20, or may specify an arbitrary account. Reservation information of at least a part of the reservation information of the reservation management server 20 is stored in the meeting management information DB 493. The reservation information acquirer 33 acquires reservation information for a predetermined period from the present out of the reservation information held by the reservation management server 20. The predetermined period is determined by how far in advance the information regarding the reservation of the meeting room 6 is to be notified.

The notification determiner 34 determines whether there is a reservation with a start time that fulfills a condition for notification in the meeting management information. For example, referring to a notification setting DB 496, it is determined to notify when a set date and time is reached, being calculated backward from the start time. Alternatively, when the reservation information acquirer 33 acquires the reservation information from the reservation management server 20, the notification determiner 34 may generate a task that notifies information regarding the reservation and register the task in a queue. The task stored in the queue is executed when an execution time (reminding time) comes.

For example, if the bot is divided by role, such as a reminder bot or a reservation bot, the bot is identified according to a process.

When determining that the notification is to be made by the notification determiner 34, the meeting information notifier 37 specifies information for identifying the bot (for example, a token in slack) and information for specifying the group to be notified, to request the chat server 10 to notify the information regarding the reservation of the meeting room 6. The notification is divided into several times, and at least one notification includes the meeting identification information. The meeting identification information is information for the meeting management server 30 to confirm that the participant has the right to use the reserved meeting room 6 during the reserved time. The meeting information notifier 37 generates the meeting identification information at least before a final notification. The meeting identification information is registered in a meeting identification information DB 494.

The control information generator 35 refers to the meeting management information to generate the control information for the electronic device 70, and registers the control information in a control information DB 497. For example, at a few minutes before the meeting start time, the control information generator 35 generates the control information to turn on the power of the electronic device 70, and when detecting a check-out, generates the control information to turn off the power of electronic device 70. The control information is stored in the control information DB 497.

The control information responder 36 accepts an inquiry about whether there is the control information from the meeting room terminal 90 of the meeting room 6, refers to the control information DB 497, and transmits the control information corresponding to the meeting room 6 to the meeting room terminal 90.

The check-in manager 38 manages the check-in/check-out to the meeting room. In addition, the check-in manager 38 mainly registers a meeting status associated with the check-in/check-out in the meeting management information DB 493. The check-in is allowed 5 to 10 minutes before the start time of the meeting specified by the reservation ID. Moreover, the check-in is permitted when a set of the meeting room ID and the meeting identification information transmitted from the meeting room terminal 90 is registered in the meeting identification information DB 494.

The device communicator 39 acquires device information from the management apparatus 110 and communicates with the meeting room terminal 90 via the bidirectional communication apparatus 130. The device information will be described in detail later.

In response to a request from the meeting room terminal 90, the reservation information transmitter 41 transmits the reservation information (meeting management information) stored in the meeting management information DB 493. The reservation information transmitter 41 may transmit in a JavaScript object notation (JSON) format, an extensible markup language (XML) format, a comma-separated values (CVS) format, or the like. The reservation information is transmitted repeatedly, and thus a format with less capacity is advantageous.

In addition, the meeting management server 30 includes a storage unit 49. The storage unit 49 is achieved by the memory 202, HDD 209, or the like in FIG. 4. The storage unit 49 stores the associating information DB 491, meeting management information DB 493, meeting identification information DB 494, customer domain DB 495, notification setting DB 496, control information DB 497, and a meeting room setting information DB 498.

TABLE 3

| Associating Information DB: | | | | | |
|---|---|---|---|---|---|
| Workspace | Channel | Member Account 1 | Member Account 2 | Member Account 3 | Member Account 4 |
| http://sample.com/1 | #marketing | a@xfood.com a@chat.com | b@xfood.com b@chat.com | c@xfood.com c@chat.com | d@xfood.com d@chat.com |
| http://sample.com/2 | #team1 | f@xfood.com f@chat.com | g@xfood.com g@chat.com | h@xfood.com h@chat.com | |
| . . . | . . . | . . . | . . . | . . . | . . . |

Table 3 illustrates an example of the associating information stored in the associating information DB 491. The associating information is information that associates the account of the reservation management system with the group of the chat system. The associating information includes each item of the work space, channel, and member accounts 1 to n (n=4 in the table). The work space and channel are as described above. The account of each participant issued by the reservation management server 20 is registered in one of the member accounts 1 to n. In addition, as illustrated in Table 3, the account of the chat system may be registered. In order to notify the group, for the reservation management server 20, there needs to be the information for specifying the account of the reservation management server 20 of the user who has reserved the meeting, the group to be notified, and the channel (in this embodiment, the work space and channel name), and there is no need to register the accounts of all members belonging to the group. However, when notifying a personal user, the account information of each chat system is required, and thus may be registered as illustrated in Table 3.

TABLE 4

Meeting Management Information DB:

| Reservation ID | Account of reservation-making user | Meeting name | Meeting Room ID | Start time | End time | Accounts of expected participant | Status |
|---|---|---|---|---|---|---|---|
| 001 | a@xfood.com | Product Z development meeting | K-001 | 2017 Jul. 7 10:00 | 2017 Jul. 7 12:00 | b@xfood.com c@xfood.com d@xfood.com | Checked in |
| 002 | e@xfood.com | Product Y development meeting | K-001 | 2017 Jul. 7 13:00 | 2017 Jul. 7 14:00 | f@xfood.com g@xfood.com | Notified |
| ... | ... | ... | ... | ... | ... | ... | ... |

Table 4 illustrates an example of the meeting management information stored in the meeting management information DB 493 of the meeting management server 30. Since the reservation information is stored in the meeting management information DB 493, the difference from the reservation information DB 291 in Table 1 will be described with reference to Table 4. The meeting management information of Table 4 includes items of a reservation-making user's name, a reservation-making user's department name, a participant's name, a participant's department name, and a status. The reservation-making user's name is a name of a user who made the reservation. The reservation-making user's department name is a name of a department to which the user who made the reservation belongs. The participant's name is a name or the like of a participant. The participant's department name is a name of a department to which the participant belongs. Since the meeting management server 30 holds or can use user information associating the account with the name, the department name or the like, when the account is obtained, the name and the department name are identified. It should be noted that at the time when the reservation information is transmitted from the reservation management server 20, the reservation information can include the reservation-making user's name, the reservation-making user's department name, the participant's name, and the participant's department name.

The status means a status of the reservation. For example, a status such as, the information regarding the reservation of the meeting room 6 has been notified, the use has been confirmed, the room has been checked in, checked out, or canceled, is registered.

TABLE 5

Meeting Identification Information DB:

| Reservation ID | Meeting room ID | Meeting identification information |
|---|---|---|
| 001 | K-001 | 1234 |
| 002 | K-002 | 5678 |
| ... | ... | ... |

Table 5 illustrates an example of meeting identification information management information stored in the meeting identification information DB 494. The meeting identification information management information is information for managing the meeting identification information for each reservation of the meeting room 6. The meeting identification information management information includes each item of a reservation ID, a meeting room ID, and meeting identification information. These items are the same as the reservation information except for the status (the reservation information received from the reservation management server 20), and the description is omitted because the description has already been made. The reservation ID is registered in order to identify the reservation of the same meeting room 6.

TABLE 6

Customer Domain DB:

| Customer domain name | Customer administrator's account |
|---|---|
| xfood.com | a@xfood.com |
| ycar.com | f@ycar.com |
| ... | ... |

Table 6 illustrates an example of the customer domain information stored in the customer domain DB 495. The customer domain information is information for managing a customer domain and a customer administrator account. In the customer domain information, a customer domain name and the customer administrator account are registered in association with each other. The customer domain in Table 6 is the domain of an account (mail address) issued by the reservation management server 20. In addition, the manager account is the account of a customer manager (representative). The accounts in Table 6 are issued by the reservation management server 20.

TABLE 7

Notification Setting DB:

| Customer domain name | Notification setting |
|---|---|
| xfood.com | One day before |
| ycar.com | 12 hours before |
| ... | ... |

Table 7 illustrates an example of notification setting information stored in the notification setting DB 496. The notification setting information holds a setting related to a notification for each customer. In the notification setting information, the customer domain name and the notification setting are registered in association with each other. In the notification setting, a timing for how far in advance before the start time of the meeting the information regarding the reservation of the meeting room 6 should be notified is set. Alternatively, a fixed date and time may be set. In addition, the timing is not limited to one, and a plurality of notification settings may be registered for one customer.

TABLE 8

Control Information DB:

| Meeting room ID | Control content |
| --- | --- |
| K-001 | Power ON |
| K-002 | Power Off |
| ... | ... |

Table 8 illustrates an example of the control information stored in the control information DB 497. The control information is information for controlling the electronic device 70 in the meeting room 6. The control information includes each item of the meeting room ID and control content. The control content is a specific control method of the electronic device 70. The meeting management server 30 can set detailed control content for each electronic device 70. In addition, a time to control is not registered. This is because it is difficult to transmit from the meeting management server 30 in the external network to the meeting room terminal 90, and thus the meeting room terminal 90 accesses the meeting management server 30, and at this point of time, if the control information is generated, the control content is transmitted.

mitted to the meeting room terminal 90 by the initial setting. The authentication key is a combination of numbers, alphabets, symbols, and the like, that is long enough to be unspecified by a brute force method. The authentication key may be determined by the meeting management server 30 or the administrator.

The management start flag is a flag (True: start, False: do not start) that indicates whether the meeting management server 30 starts managing the meeting room after the initial setting of the meeting room terminal 90 is completed. With the start flag, it is possible to suppress inconvenience caused by a time lag from the completion of the initial setting to the placement of the meeting room terminal 90. The details will be described later.

The number of meeting room terminals 90 that can be registered is the number of meeting room terminals 90 that can be associated with one meeting room. There is no problem if there is one meeting room terminal 90 in one meeting room. However, if an abnormality occurs in the meeting room terminal 90, it is difficult to check in the meeting room during repair. For this reason, the administrator may want to associate multiple meeting room terminals 90 with one meeting room. Therefore, even if the

TABLE 9

Meeting Room Setting Information DB:

| Customer ID | Meeting room name | Meeting room ID | State of meeting room terminal | Authentication key | Management start flag | Number of meeting room terminals that can be registered |
| --- | --- | --- | --- | --- | --- | --- |
| G-001 | Meeting room A | K-001 | Connected | ***** | True | 1 |
| | Meeting room B | K-002 | Before set-p | ***** | False | 1 |
| | Meeting room C | K-003 | Disconnected | ***** | True | 2 |

Table 9 illustrates an example of the meeting room setting information stored in the meeting room setting information DB 498. The meeting room setting information is information related to the setting for each meeting room. The meeting room includes each item of a meeting room name, a meeting room ID, a state of the meeting room terminal 90, an authentication key, a management start flag, and a number of meeting room terminals 90 that can be registered, in association with a customer ID.

The meeting room name is a general name of a meeting room recognized by the participants of the meeting, for example, a name presented at the entrance of the meeting room.

The meeting room ID is identification information for uniquely identifying the meeting room as described above. For simplicity, the meeting room ID can be shared with the reservation management server 20. In addition, by providing a conversion table, the administrator can also set the meeting room ID separately from the reservation management server 20.

The state of the meeting room terminal 90 indicates whether the initial setup of the meeting room terminal 90 has been completed or communication is possible.

Connected: communication is confirmed within a certain period

Before setup: before initial setting

Disconnected: no communication for a certain period

The authentication key is authentication information for the meeting management server 30 to authenticate the meeting room terminal 90. The authentication key is transauthentication key leaks to the outside, the terminal IDs match and the number is fixed, and thus it is possible to prevent the leak of the reservation information to the outside, or the like. The initial value may be 1 or plural.

The meeting room name and meeting room ID are predetermined or can be set by the administrator. The meeting room name and meeting room ID may be transmitted from the reservation management server 20 and used. The initial state of the meeting room terminal 90 (immediately after setting by a provider) is before setup, and transits depending on a communication state. For example, the meeting management server 30 assigns and set an authentication key during initialization, and the management start flag is set by the administrator from a setting screen described later, or the like. The administrator can also set the number of the meeting room terminals 90 that can be registered. The number of the meeting room terminals 90 that can be registered is often 1 or more. When the number is set to 1, the meeting room terminals 90 that can be registered in one meeting room is one.

Registered Terminal:

The registration terminal 50 includes a communicator 51, an operation acceptor 52, and a display controller 53. These functional units of the registration terminal 50 are functions are means that are implemented by operating one or more hardware components illustrated in FIG. 4 in cooperation with instructions of the CPU 201 according to the program 209p loaded from the HDD 209 to the memory 202. This program 209p is distributed from a program distribution server or distributed in a state of being stored in a storage medium.

The registration terminal 50 is a terminal for the administrator to perform various settings related to the meeting room via a Web page provided by the meeting management server 30. One of these settings is an initial setting. In addition, the registration terminal 50 is also a terminal for the administrator to perform various settings for the meeting room terminal 90 via a Web page provided by the management apparatus 110. The functions of the communicator 51, operation acceptor 52, and display controller 53 included in the registration terminal 50 are the same as the functions of the terminal apparatus 60, and the details will be described together with the terminal apparatus 60.

Figure 7:
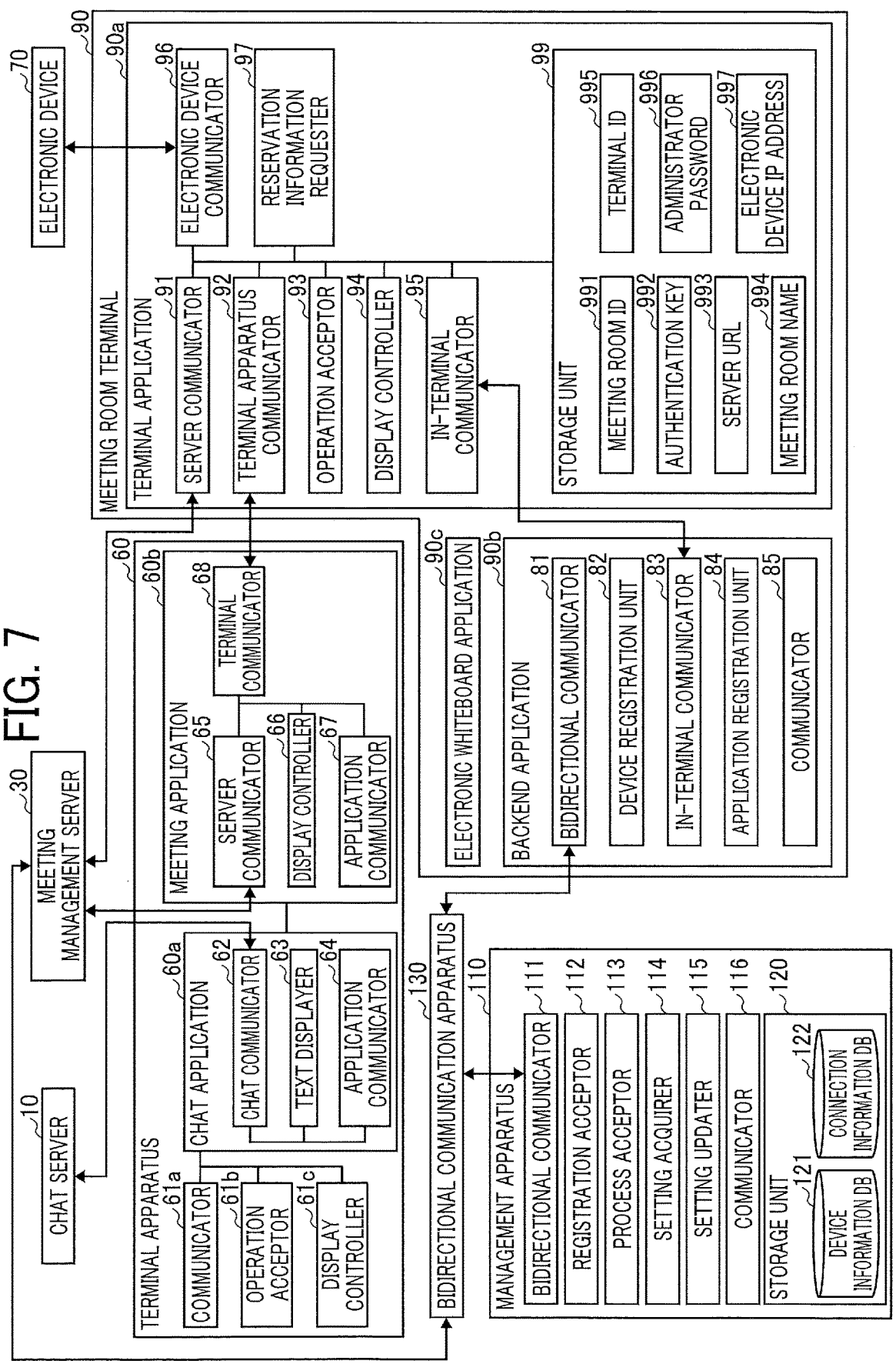
FIG. 7 is a block diagram illustrating functional configurations of a terminal apparatus and the meeting room terminal, according to an embodiment of the present disclosure.

Terminal Apparatus:

FIG. 7 is an example of a functional block diagram illustrating the functions of the terminal apparatus 60, meeting room terminal 90, and management apparatus 110 in a block form. The functions of the electronic device 70 will be described according to need.

The terminal apparatus 60 includes a communicator 61*a*, an operation acceptor 61*b*, a display controller 61*c*, a chat communicator 62, a text displayer 63, an application communicator 64, a server communicator 65, a display controller 66, an application communicator 67, and a terminal communicator 68. These functional units of the terminal apparatus 60 are functions or means that are implemented by operating one or more hardware components illustrated in FIG. 4 in cooperation with instructions of the CPU 201 according to the program 209*p* loaded from the HDD 209 to the memory 202. This program 209*p* is distributed from a program distribution server or distributed in a state of being stored in a storage medium. In the terminal apparatus 60, a chat application 60*a* and a meeting application 60*b* operate, and thus the program 209*p* includes the chat application 60*a* and the meeting application 60*b*.

The communicator 61*a* transmits and receives various information to/from the meeting management server 30 and the reservation management server 20. The communicator 61*a* is achieved by the CPU 201 in FIG. 4 executing the program 209*p* and controlling the network driver 205.

The operation acceptor 61*b* accepts various operations of the participant with respect to the terminal apparatus 60. The operation acceptor 61*b* is achieved by the CPU 201 in FIG. 4 executing the program 209*p* and controlling the input device 210.

The display controller 61*c* interprets the screen information of various screens and displays the screen information on the LCD 206. The operation acceptor 61*b* and the display controller 61*c* include, for example, a browser function, and can execute a Web application. For example, the display controller 61*c* displays the reservation setting screen received from the reservation management server 20, and the operation acceptor 61*b* accepts the reservation information set by the user who makes a reservation.

The chat communicator 62 of the chat application 60*a* transmits and receives various information to/from the chat server 10. In this embodiment, the chat communicator 62 receives information regarding the reservation of the meeting room 6 the chat server 10, and notifies the chat server 10 of that the information has been read, whether the meeting room 6 will be used or cancelled, or the like. The chat communicator 62 is achieved by the CPU 201 in FIG. 4 executing the program 209*p* and controlling the network driver 205, for example.

The text displayer 63 of the chat application 60*a* displays a text transmitted from the chat server 10 (information regarding the reservation of the meeting room 6). The text displayer 63 is achieved by the CPU 201 in FIG. 4 executing the chat application 60*a*, for example.

The application communicator 64 of the chat application 60*a* calls the meeting application 60*b* and transmits the meeting identification information to the meeting application 60*b*. The chat server 10 transmits information for identifying the meeting application 60*b* to the terminal apparatus 60 when notifying the information regarding the reservation of the meeting room 6. Thus, the chat application 60*a* specifies the meeting application 60*b* to the OS and requests a notification of the meeting identification information. The OS can start the meeting application 60*b*. The application communicator 64 is achieved by the CPU 201 in FIG. 4 executing the chat application 60*a*, for example.

The server communicator 65 of the meeting application 60*b* communicates with the meeting management server 30. A two-dimensional code including the meeting identification information is acquired from the meeting management server 30. The server communicator 65 is achieved by the CPU 201 in FIG. 4 executing the meeting application 60*b*, for example. The two-dimensional code is used for authentication at check-in, and may be a few digits for authentication.

The display controller 66 of the meeting application 60*b* displays, on the LCD 206, the two-dimensional code including the meeting identification information. The display controller 66 is achieved by the CPU 201 in FIG. 4 executing the meeting application 60*b* and controlling the graphics driver, for example.

The application communicator 67 of the meeting application 60*b* acquires various information (meeting identification information or the like included in the information regarding the reservation of the meeting room 6) from the chat application 60*a* through the OS. The application communicator 67 is achieved by the CPU 201 in FIG. 4 executing the meeting application 60*b*, for example.

The terminal communicator 68 communicates with the meeting room terminal 90 and transmits the meeting identification information and the like. The terminal communicator 68 detects the presence of the meeting room terminal 90 by short-range wireless communication such as Bluetooth (registered trademark) and transmits the meeting identification information when detecting the meeting room terminal 90. In addition, the terminal communicator 68 provides the meeting room terminal 90 with a function to display the two-dimensional code. The terminal communicator 68 is achieved by the CPU 201 in FIG. 4 executing the meeting application 60*b*, for example.

Meeting Room Terminal:

In the meeting room terminal 90, a terminal application 90*a*, a backend application 90*b*, and an electronic whiteboard application 90*c* are installed. Each of the applications includes functions as illustrated in the figure. The electronic whiteboard application 90*c* is an application that enables handwritten input to the meeting room terminal 90.

The meeting room terminal 90 includes, as the function of the terminal application 90*a*, a server communicator 91, a terminal apparatus communicator 92, an operation acceptor 93, a display controller 94, an in-terminal communicator 95, an electronic device communicator 96, and a reservation information requester 97. These functional units of the meeting room terminal 90 are functions or means that are implemented by operating one or more hardware components illustrated in FIG. 5 in cooperation with instructions of the CPU 601 according to the program 604*p* expanded from the EEPROM 604 to the RAM 603. This program 604*p* is distributed from a program distribution server or distributed in a state of being stored in a storage medium.

The server communicator 91 communicates with the meeting management server 30 with a server URL 993 as a destination. Since the meeting room terminal 90 is present in the internal network, it is difficult to communicate with the meeting room terminal 90 from the meeting management server 30 (when the bidirectional communication apparatus is not used). Therefore, the server communicator 91 communicates with the meeting management server 30 by a communication technology such as polling (communication with the meeting management server 30 periodically) and WebSocket. The server communicator 91 is required to communicate with a communication protocol such as HTTP, and the communication protocol is not particularly limited.

The server communicator 91 of this embodiment receives the reservation information, and transmits, to the meeting management server 30, the meeting identification information received by the terminal apparatus communicator 92 from the terminal apparatus 60 or the meeting identification information input by hand at the time of check-in. In addition, the server communicator 91 receives the control information from the meeting management server 30. Moreover, the server communicator 91 can bidirectionally communicate with the management apparatus 110 via the bidirectional communication apparatus 130.

The terminal apparatus communicator 92 communicates with the terminal apparatus 60. In this embodiment, the terminal apparatus communicator 92 receives the meeting identification information or the like. If the meeting identification information is input by hand, the terminal apparatus communicator 92 may not be required. The terminal apparatus communicator 92 is achieved by the CPU 601 in FIG. 5 executing the program 604p and controlling the short-range wireless communication device 615 or the RF tag reader/writer 622.

The in-terminal communicator 95 communicates with other applications in the meeting room terminal 90 (electronic whiteboard application 90c, backend application 90b). For communication, the function of the OS may be used as appropriate.

The electronic device communicator 96 communicates with the electronic device 70. In this embodiment, the electronic device communicator 96 transmits the control information received by the server communicator 91 to the electronic device 70. The electronic device communicator 96 is achieved by the CPU 601 in FIG. 5 executing the program 604p and controlling the wireless LAN communication device 613.

The display controller 94 displays, on the display 616, a screen generated by the terminal application 90a. This screen is a standby screen that allows check-in, check-out, or the like. The display controller 94 according to this embodiment determines whether a private setting is associated with the reservation information. If the private setting is associated with the reservation information, the display controller 94 hides a private target item indicated by the private setting, or uses a fixed notation.

The operation acceptor 93 accepts various operations on the meeting room terminal 90. For example, the operation acceptor 93 accepts a check-in, a manual input of the meeting identification information, and a check-out.

At periodical timings when the reservation information is to be acquired, the reservation information requester 97 repeatedly transmits, to the meeting management server 30, the meeting room ID 991 and the authentication key 992, with the server URL 993 stored in the storage unit 99 as the destination, via the server communicator 91. As a response to this, the reservation information requester 97 acquires the reservation information via the server communicator 91. It is sufficient that the reservation information be acquired when any change is made in the reservation information. For example, the reservation information requester 97 transmits the meeting room ID and the authentication key every few seconds to every few minutes. The shorter the periodical timings, the sooner the reservation information updated. However, the shorter the periodical timings, the larger the communication load. Accordingly, the periodical timings are determined in view of both the update frequency of the reservation information and the communication load. In the embodiment, the reservation information requester 97 acquires the reservation information every thirty seconds, for example. In addition, at least the meeting management information (reservation information) of the meeting room 6 on a current day can be received via the server communicator 91.

The meeting room terminal 90 includes the storage unit 99. The storage unit 99 is achieved by the ROM 602 and EEPROM 604 in FIG. 5. The storage unit 99 stores a meeting room ID 991, an authentication key 992, a server URL 993, a meeting room name 994, a terminal ID 995, an administrator password 996, and an IP address 997 of the electronic device 70. These are part or all of the setting information set in the meeting room terminal 90 (terminal application 90a). In addition, the meeting room ID 991, the authentication key 992, and the server URL 993 are information required for communication with the meeting management server 30.

The terminal ID 995 is identification information of the meeting room terminal 90. The terminal ID is used by the meeting management server 30 to identify the meeting room terminal 90 in order to prevent more than a predetermined number of meeting room terminals 90 from connecting to the meeting management server 30 in one meeting room. The terminal ID is required to be unique, such as a universally unique identifier (UUID) of the terminal application 90a and a MAC address. The UUID is a unique identifier in which two or more items do not have the same value in the world without specific management. The administrator password 996 is set by the administrator when the terminal application 90a is installed or at a first startup. The IP address 997 of the electronic device 70 is set by the administrator according to need.

In addition, the meeting room terminal 90 includes, as the function of the backend application 90b, a bidirectional communicator 81, a device registration unit 82, an in-terminal communicator 83, an application registration unit 84, and a communicator 85.

The bidirectional communicator 81 performs bidirectional communication with the management apparatus 110 or the meeting management server 30 via the bidirectional communication apparatus 130. When the backend application 90b is installed in the meeting room terminal 90, the device registration unit 82 registers the device information in the management apparatus 110 and the bidirectional communication apparatus 130. The in-terminal communicator 83 bidirectionally communicates with the in-terminal communicator 95 on the terminal application 90a side. The application registration unit 84 registers, in the management apparatus 110, information (an application ID, an application name, a version, etc.) related to the application installed in the meeting room terminal 90. The communicator 85 is connected to the network N1 and communicates with other devices without going through the bidirectional communication apparatus 130.

Management Apparatus:

The management apparatus 110 includes a bidirectional communicator 111, a registration acceptor 112, a process acceptor 113, a setting acquirer 114, a setting updater 115, and a communicator 116. These functional units of the management apparatus 110 are functions or means that are implemented by operating one or more hardware components illustrated in FIG. 4 in cooperation with instructions of the CPU 201 according to the program 209p loaded from the HDD 209 to the memory 202.

The bidirectional communicator 111 performs bidirectional communication with the meeting room terminal 90 via the bidirectional communication apparatus 130. The registration acceptor 112 accepts a registration request for the device information and the information related to the application from the backend application 90b, and registers, in a device information DB 121 or a connection information DB 122, the device information and the information related to the application.

The process acceptor 113 generates screen information of the remote setting screen, which will be described later, and transmits the screen information to the registration terminal 50 via the communicator 116. The screen information is created by hypertext markup language (HTML), cascade style sheet (CSS), JavaScript (registered trademark), or the like. The setting screen is provided as a screen of a Web application that runs on a browser by JavaScript (registered trademark).

In response to a request from the meeting management server 30 or the administrator (the registration terminal 50), the setting acquirer 114 acquires the setting information of the meeting room terminal 90 via the bidirectional communication apparatus 130. When there is a request from the meeting management server 30 or the administrator (registration terminal), the setting updater 115 updates the setting information of the meeting room terminal 90 via the bidirectional communication apparatus 130. The communicator 116 is connected to the network N2, and communicates with other devices without going through the bidirectional communication apparatus 130. In addition, the management apparatus 110 also includes a storage unit 120. The storage unit 120 is achieved by the memory 202, HDD 209, or the like in FIG. 4. The storage unit 120 stores the device information DB 121 and the connection information DB 122.

TABLE 10

| No. | Device ID | MAC address | Installed application ID | Application version |
|---|---|---|---|---|
| 1 | ABC | XXXX | jp.co.aaaaa.aap1 | 1.0 |
|   |   |   | jp.co.aaaaa.aap2 | 1.1 |
| 2 | DEF | YYYY | jp.co.aaaaa.aap1 | 0.9 |
| 3 | GHI | ZZZZ | jp.co.aaaaa.aap3 | 1.5 |

Table 10 schematically illustrates the device information stored in the device information DB 121. The device information includes a serial number assigned to each record. Furthermore, a MAC address, an installed application ID, and the like are associated with the device ID. The device ID is information for identifying or specifying the meeting room terminal 90 (or the backend application 90b). The MAC address is a physical address that is uniquely assigned to the hardware of a network device, such as a LAN card that is set to identify each node (the meeting room terminal 90) on a network. The installed application ID is identification information for identifying or specifying an application (the terminal application 90a, backend application 90b, electronic whiteboard application 90c, etc.) installed in the meeting room terminal 90. The application version is a version of each application that is installed.

Of the device information, the device ID, or the device ID and the application ID are communication information for the management apparatus 110 to communicate with the meeting room terminal 90. In addition to this, the following connection ID (an example of the connection information) may be included. The device ID is the communication information in this embodiment.

TABLE 11

| No. | Device ID | Connection ID | Connection state |
|---|---|---|---|
| 1 | ABC | 1111 | Disconnected |
| 2 | ABC | 2222 | Connected |
| 3 | DEF | 3333 | Connected |
| 4 | GHI | 4444 | Connected |

Table 11 schematically illustrates the connection information stored in the connection information DB 122. The connection information includes a serial number assigned to each record, and a connection ID and a connection state are associated with the device ID. The connection ID is information for the bidirectional communication apparatus 130 to determine whether the management apparatus 110 has the authority to communicate with the meeting room terminal 90. Such information is sometimes referred to as an access token. In the connection state, the state of communication with the meeting room terminal 90 (connected or disconnected) is registered. The connection ID may be the communication information for the management apparatus 110 to communicate with the meeting room terminal 90.

Figure 8:
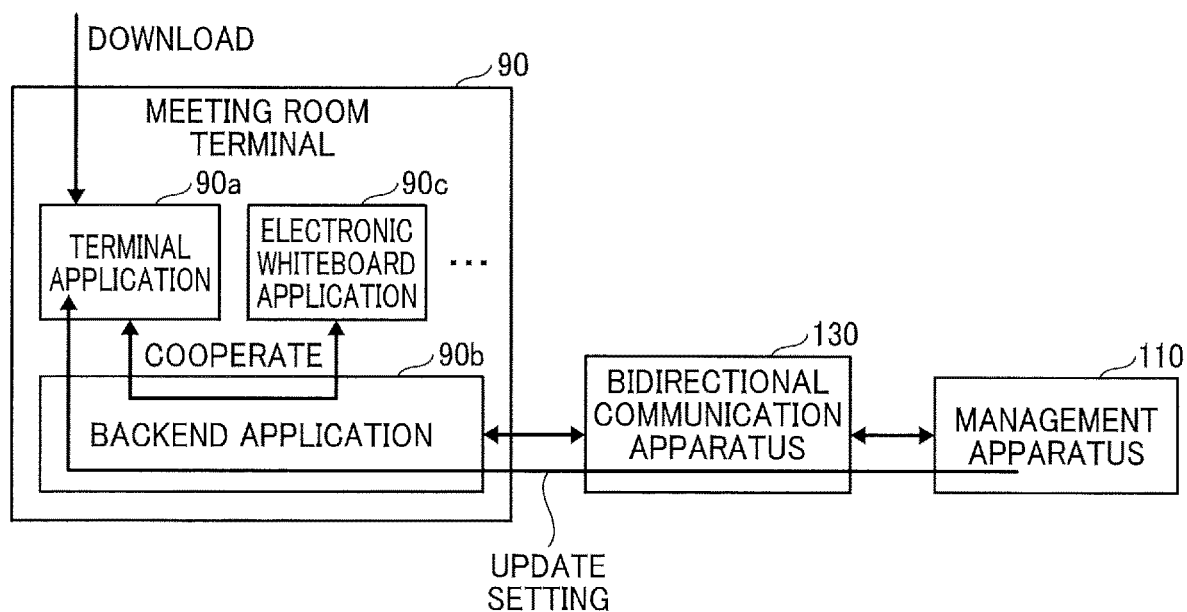
FIG. 8 is a schematic diagram illustrating a relation among a backend application, a terminal application, and an electronic whiteboard application installed in the meeting room terminal, according to an embodiment of the present disclosure.

Relation among Backend Application, Terminal Application, Electronic Whiteboard Application:

FIG. 8 schematically illustrates the relation among the backend application 90b, terminal application 90a, and electronic whiteboard application 90c installed in the meeting room terminal 90. The backend application 90b can communicate with other applications inside the terminal. For example, in an OS called Android (registered trademark), a function called intent communication is known.

For example, when the terminal application 90a detects an event such as a check-in acceptance and notifies the backend application 90b, the backend application 90b requests the electronic whiteboard application 90c associated with the event to start (ON). In this manner, the backend application 90b is used to allow the terminal application 90a and the electronic whiteboard application 90c installed in the meeting room terminal 90 to cooperate.

In addition, by using the ability to communicate within the meeting room terminal 90, the backend application 90b can be restarted when stopped during monitoring the life and death of the application. In addition, being connected to the bidirectional communication apparatus 130, the backend application 90b can accept a remote operation from the management apparatus 110. For example, the management apparatus 110 can communicate with the backend application 90b with the use of bidirectional communication and can update the settings of each application. Moreover, the backend application 90b can access an application distribution site, and if there is a new version of the terminal application 90*a*, the new version of the terminal application 90*a* can be downloaded and updated.

Furthermore, the backend application 90*b* installed in the meeting room terminal 90 can automatically register, in the management apparatus 110, the meeting room terminal 90 and the application installed in the meeting room terminal 90 (as long as the administrator installs the application).

The terminal application 90*a* includes, for example, a function for waiting for the meeting room user to start using the meeting room (check-in) and notifying the meeting management server 30 of the start of use, and a function for displaying the meeting information transmitted from the meeting management server 30. The terminal application 90*a* is displayed on the meeting room terminal 90 mainly before the start (when accepting check-in) and after the end of an actual meeting. In addition, the electronic whiteboard application 90*c* includes a handwriting input function and a handwriting collaborative editing function with a remote location (an example of the handwriting application), is displayed during the meeting (after the meeting starts) or the like, and is used by the user (an example of the acceptance application). As other applications, there may be applications to use during the meeting, such as a recording application that records voice during the meeting, an automatic minutes creation application by voice conversion to text, and a data sharing application that acquires and shares data such as personal storage.

The recording application, automatic minutes creation application, and data sharing application are collectively referred to as information collection application. The information collection application collects information during the meeting after the start of use of the meeting room. The acceptance application and the information collection application are an example of the meeting application.

Furthermore, the backend application 90*b* includes a home application function that configures a home screen (main screen/initial screen) of the meeting room terminal 90, in addition to an intermediary function for bidirectional communication after installation and performing setting/ operation control to (for) each application and acquiring a state from each application. For this reason, the backend application 90*b* functions as a framework or middleware in the meeting room terminal 90 as a base in which the terminal application 90*a* and other applications operate and cooperate externally.

As the setting for the meeting application, for example, the backend application 90*b* displays the terminal application 90*a* on a foreground of the meeting room terminal 90 until accepting the start of use of the meeting room, and displays the information collection application on the foreground of the meeting room terminal 90 after accepting the start of use of the meeting room.

In addition, the backend application can collect information on the start and stop or state information of other applications as the control of the other applications.

Figure 9:
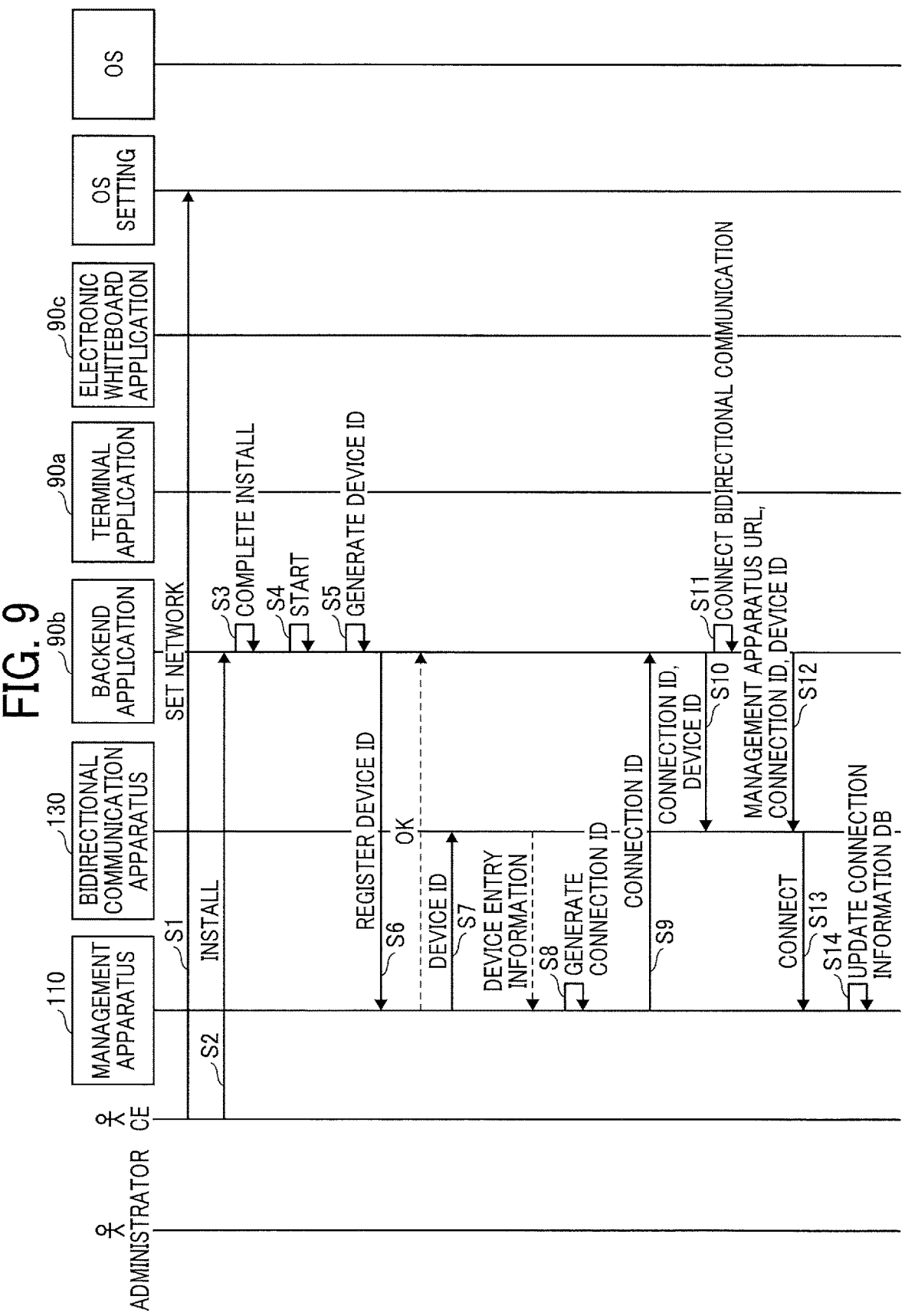
FIG. 9 is a sequence diagram illustrating an example of a procedure by which the backend application installed in the meeting room terminal registers, an application installed in the meeting room terminal, in the management apparatus and the meeting room terminal, according to an embodiment of the present disclosure.

Automatic Registration of Meeting Room Terminal:

First, a procedure for automatic registration of the meeting room terminal 90 will be described with reference to FIG. 9. FIG. 9 is a sequence diagram illustrating an example of a procedure by which the backend application 90*b* installed in the meeting room terminal 90 registers the meeting room terminal 90 and an application installed in the meeting room terminal 90 in the management apparatus 110.

S1: First, a customer engineer (CE) operates the OS of the meeting room terminal 90 to set the network. In other words, the CE sets a service set identifier (SSID) and an SSID password.

S2: Next, the CE downloads the backend application 90*b* from the application distribution site and installs the backend application 90*b* on the meeting room terminal 90. The system user, or the owner or administrator of the terminal may perform the settings and installation operations.

S3, S4: Installation is completed. The backend application 90*b* after installation is automatically started, or may be started by the CE.

S5: When installed, the device registration unit 82 of the backend application 90*b* starts automatic registration of the meeting room terminal 90 to the management apparatus 110. In addition, the device registration unit 82 detects the installed application from the OS or the like. The device registration unit 82 generates a device ID that does not overlap. The device ID may be generated by the management apparatus 110.

S6: The device registration unit 82 specifies the device ID and requests the bidirectional communication apparatus 130 to register the device ID. The bidirectional communication apparatus 130 registers the device ID when receiving the device ID, and returns OK.

S7: The bidirectional communicator 111 of the management apparatus 110 transmits the device ID to the bidirectional communication apparatus 130. The bidirectional communication apparatus 130 transmits device entry information to the management apparatus 110. The entry information is for registering the device.

S8: The bidirectional communicator 111 of the management apparatus 110 receives the entry information, and the registration acceptor 112 generates the connection ID with the entry information.

S9: The registration acceptor 112 of the management apparatus 110 transmits the connection ID to the backend application 90*b* via the bidirectional communicator 111.

S10: The bidirectional communicator 81 of the backend application 90*b* receives the connection ID, and the device registration unit 82 transmits the connection ID and the device ID to the bidirectional communication apparatus 130. If the connection ID contains information for specifying the device ID, the device ID does not have to be transmitted. By such process, the backend application 90*b*, management apparatus 110, and bidirectional communication apparatus 130 can hold the device ID and the connection ID.

S11: When registration of the device information is completed, the bidirectional communicator 81 of the backend application 90*b* starts (connects to) bidirectional communication with the management apparatus 110 with the use of the connection ID.

S12: The bidirectional communicator 81 of the backend application 90*b* specifies the URL, connection ID, and device ID of the management apparatus 110 and requests the bidirectional communication apparatus 130 to connect to the management apparatus 110. After that, the bidirectional communicator 81 maintains communication between the backend application 90*b* and the bidirectional communication apparatus 130 until the application is forcibly terminated. When the backend application 90*b* ends, the backend application 90*b* automatically restarts and starts again from generation of the device ID and acquisition of the connection ID.

S13: The bidirectional communication apparatus 130 authenticates the combination of the connection ID and device ID, and if the authentication is successful, connects to a URL of the management apparatus 110.

S14: The bidirectional communicator 111 of the management apparatus 110 receives the device ID, and updates the connection state associated with the device ID in the connection information DB 122 to "connected". With the above, the meeting room terminal 90 and the management apparatus 110 are connected via the bidirectional communication apparatus 130.

While the backend application 90b and the bidirectional communication apparatus 130 are connected, the bidirectional communication apparatus 130 uses a specific port (for example, 443) of the meeting room terminal 90, and performs hypertext transfer protocol secure (HTTPS) communication with the backend application 90b by WebSocket. This makes it possible to communicate beyond a firewall. A protocol such as HTTPS can be specified by the administrator with the use of the software development kit (SDK) library in the bidirectional communication apparatus 130.

While the backend application 90b and the bidirectional communication apparatus 130 are connected, the backend application 90b also operates as a server. Therefore, setting and control are performed according to a request from the bidirectional communication apparatus 130.

Figure 10:
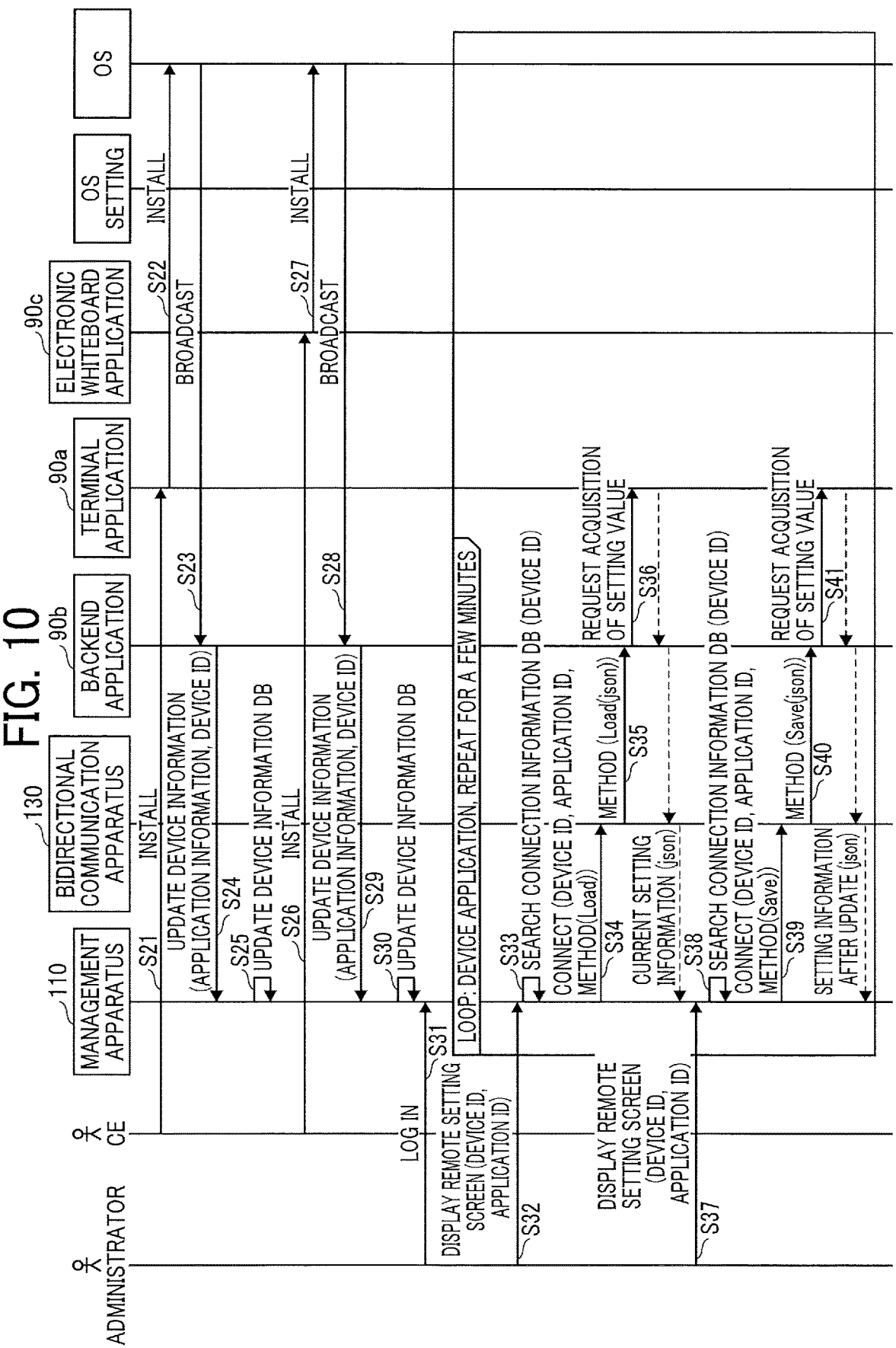
FIG. 10 is a sequence diagram illustrating an example of a procedure by which an administrator causes the management apparatus to communicate with the meeting room terminal to set setting information in the meeting room terminal, according to an embodiment of the present disclosure.

Subsequently, FIG. 10 is a sequence diagram illustrating an example of a procedure by which the administrator causes the management apparatus 110 to communicate with the meeting room terminal 90 to set the setting information in the meeting room terminal 90.

S21: The CE installs the terminal application 90a in the meeting room terminal 90.

S22: The terminal application 90a notifies the OS that the terminal application 90a has been installed by the OS mechanism.

S23: The OS notifies the backend application 90b of the application information of the terminal application 90a by a mechanism called broadcast that notifies all of the other applications of the installed terminal application 90a.

S24: The backend application 90b receives the application information of the terminal application 90a from the OS, and the application registration unit 84 specifies the application information and the device ID and transmits a device information update request to the management apparatus 110 via the communicator 85. This application information includes the application ID and the version.

S25: The communicator 116 of the management apparatus 110 receives the device information update request, and the registration acceptor 112 adds the application information (the application ID and the version) in association with the device ID of the device information DB 121.

S26 to S30: The process when the CE installs the electronic whiteboard application 90c is the same as steps S21 to S25.

S31: Next, the administrator operates the registration terminal 50 to communicate with the management apparatus 110, and first logs in. The login method may be a publicly known method. The administrator and the CE may be the same person.

S32: The administrator displays the remote setting screen on the registration terminal 50. The process acceptor 113 generates the screen information of the remote setting screen and transmits the screen information to the registration terminal 50. The operation acceptor 52 of the registration terminal 50 accepts the input of the device ID and the application ID. Since the application ID can be searched, just the device ID may be input. In addition, the operation acceptor 52 accepts an operation for acquiring the setting information of the meeting room terminal 90. The communicator 51 of the registration terminal 50 transmits the device ID and the application ID to the management apparatus 110.

S33: The communicator 116 of the management apparatus 110 receives the device ID and the application ID. The process acceptor 113 searches the connection information DB 122 by the device ID. With this, the connection ID associated with the device ID can be specified.

S34: The setting acquirer 114 of the management apparatus 110 specifies the application ID, connection ID, and device ID via the bidirectional communicator 111 and connects to the bidirectional communication apparatus 130. The bidirectional communication apparatus 130 authenticates whether the combination of the connection ID and device ID is registered. If the authentication is successful, the setting acquirer 114 specifies the device ID, the application ID indicating the terminal application 90a, and the method (Load), and makes a connection request to the bidirectional communication apparatus 130. The method (Load) is an instruction to read the setting of the application with the application ID.

S35: The bidirectional communication apparatus 130 specifies the application ID and transmits the method (Load) to the backend application 90b of the meeting room terminal 90 specified by the device ID. In doing so, a data format such as json, xml, or the like can be requested.

S36: The bidirectional communicator 81 of the backend application 90b receives the application ID and the method (Load), and the in-terminal communicator 83 requests the setting information from the terminal application 90a specified by the application ID. The in-terminal communicator 83 can acquire the setting information of the terminal application 90a, such as the information stored in the storage unit 99, from the terminal application 90a. The current setting information is transmitted to the management apparatus 110 via the backend application 90b and the bidirectional communication apparatus 130. The bidirectional communicator 111 of the management apparatus 110 receives the setting information. The process acceptor 113 generates the screen information of the remote setting screen, that displays the current setting information, and transmits the screen information to the registration terminal 50. The administrator can check the current setting information.

S37: Next, a process in which the administrator newly sets the setting information in the meeting room terminal 90 will be described. The administrator enters the device ID and the application ID on the remote setting screen displayed by the registration terminal 50. This device ID is a device ID of the meeting room terminal 90 for which the setting information is desired to be set. In addition, new setting information can be set, or the setting information acquired in step S28 may be used. The operation acceptor 52 of the registration terminal 50 accepts the input of the device ID, application ID, and setting information. Since the application ID can be searched, just the device ID may be used. Moreover, the operation acceptor 52 accepts an operation for updating the setting information of the meeting room terminal 90. The communicator 51 of the registration terminal 50 transmits the device ID, application ID, and setting information to the management apparatus 110.

S38: The communicator 116 of the management apparatus 110 receives the device ID, application ID and setting information. The process acceptor 113 searches the connection information DB 122 by the device ID. With this, the connection ID associated with the device ID can be specified.

S39: The setting updater 115 of the management apparatus 110 specifies the application ID, setting information, connection ID, and device ID via the bidirectional communicator 111 and connects to the bidirectional communication apparatus 130. The bidirectional communication apparatus 130 authenticates whether the combination of the connection ID and device ID is registered. If the authentication is successful, the setting updater 115 specifies the device ID, the application ID indicating the terminal application 90a, and the method (Save) via the bidirectional communicator 111, and makes a connection request to the bidirectional communication apparatus 130. Since the method (Save) is an instruction to set the setting information in the application with the application ID, the setting information is also transmitted.

S40: The bidirectional communication apparatus 130 specifies the application ID and transmits the method (Save) and the setting information to the backend application 90b of the meeting room terminal 90 specified by the device ID.

S41: The bidirectional communicator 81 of the backend application 90b receives the application ID, method (Save), and setting information, and the in-terminal communicator 83 requests the terminal application 90a specified by the application ID to update the setting information. With this, the in-terminal communicator 95 of the terminal application 90a updates (overwrites) the setting information of the terminal application 90a, such as the information stored in the storage unit 99. In addition, the in-terminal communicator 95 acquires the setting information after the update. The setting information after the update is transmitted to the management apparatus 110 via the backend application 90b and the bidirectional communication apparatus 130. The process acceptor 113 of the management apparatus 110 generates the screen information of the remote setting screen that displays the current setting information, and transmits the screen information to the registration terminal 50. The administrator can check the setting information after the update.

Figure 11:
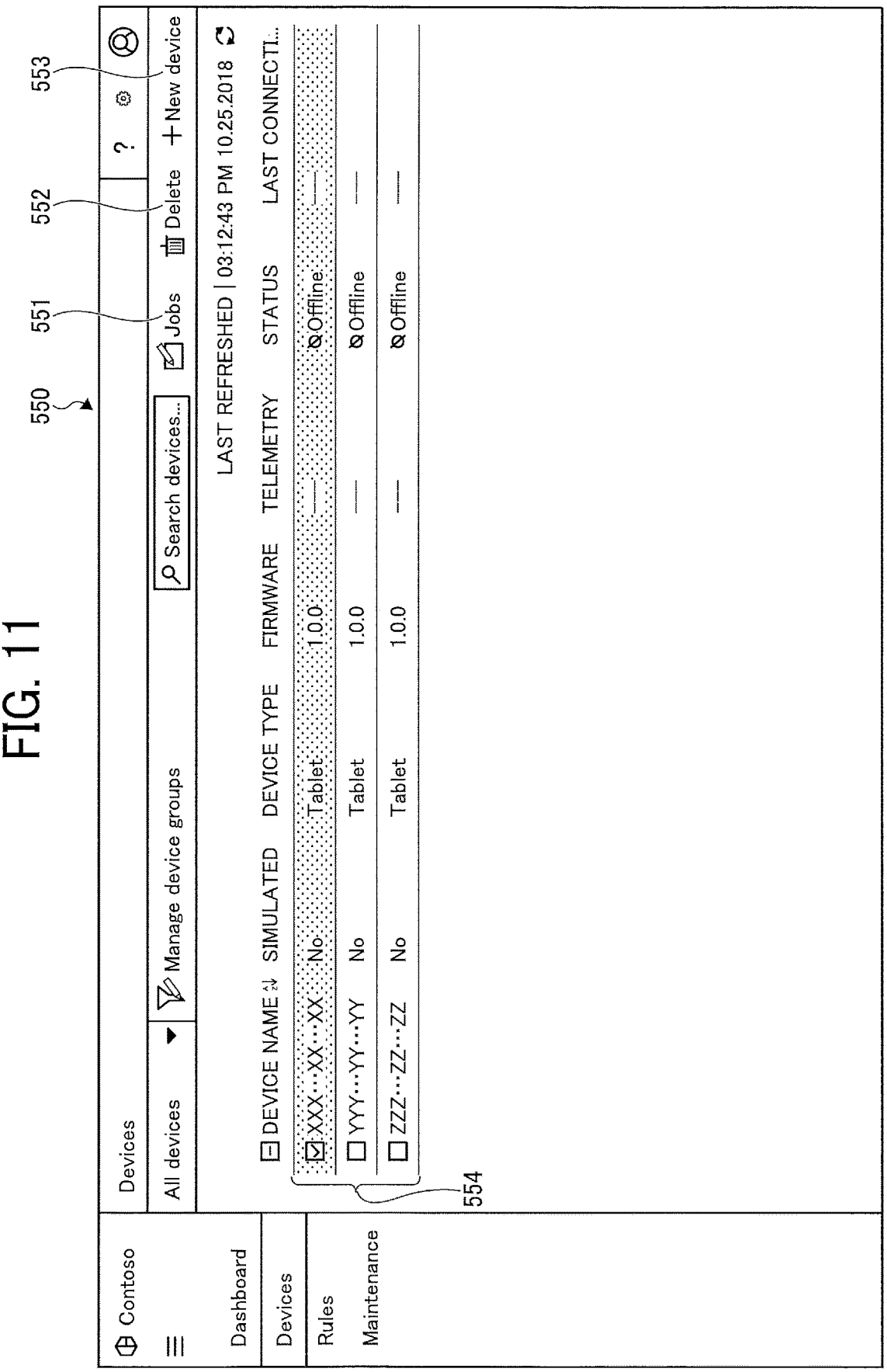
FIG. 11 is a diagram illustrating an example of a remote setting screen that displays a result of searching the meeting room terminal, according to an embodiment of the present disclosure.

Screen Example:

A remote setting screen 550 displayed on the registration terminal 50 in the process of FIG. 10 will be described with reference to FIGS. 11 and 12. FIG. 11 illustrates an example of the remote setting screen 550 that displays a result of searching the meeting room terminal 90. In the remote setting screen 550 of FIG. 11, a device name list 554 listing device names suitable for the search is displayed.

The remote setting screen 550 includes a jobs button 551, a Delete button 552, and a New device button 553. The jobs button 551 is a button for opening a menu for transmitting a setting to the meeting room terminal 90. The Delete button 552 is a button for deleting the selected meeting room terminal 90 from the registered meeting room terminals 90. The New device button 553 is a button for newly registering the meeting room terminal 90.

Figure 12:
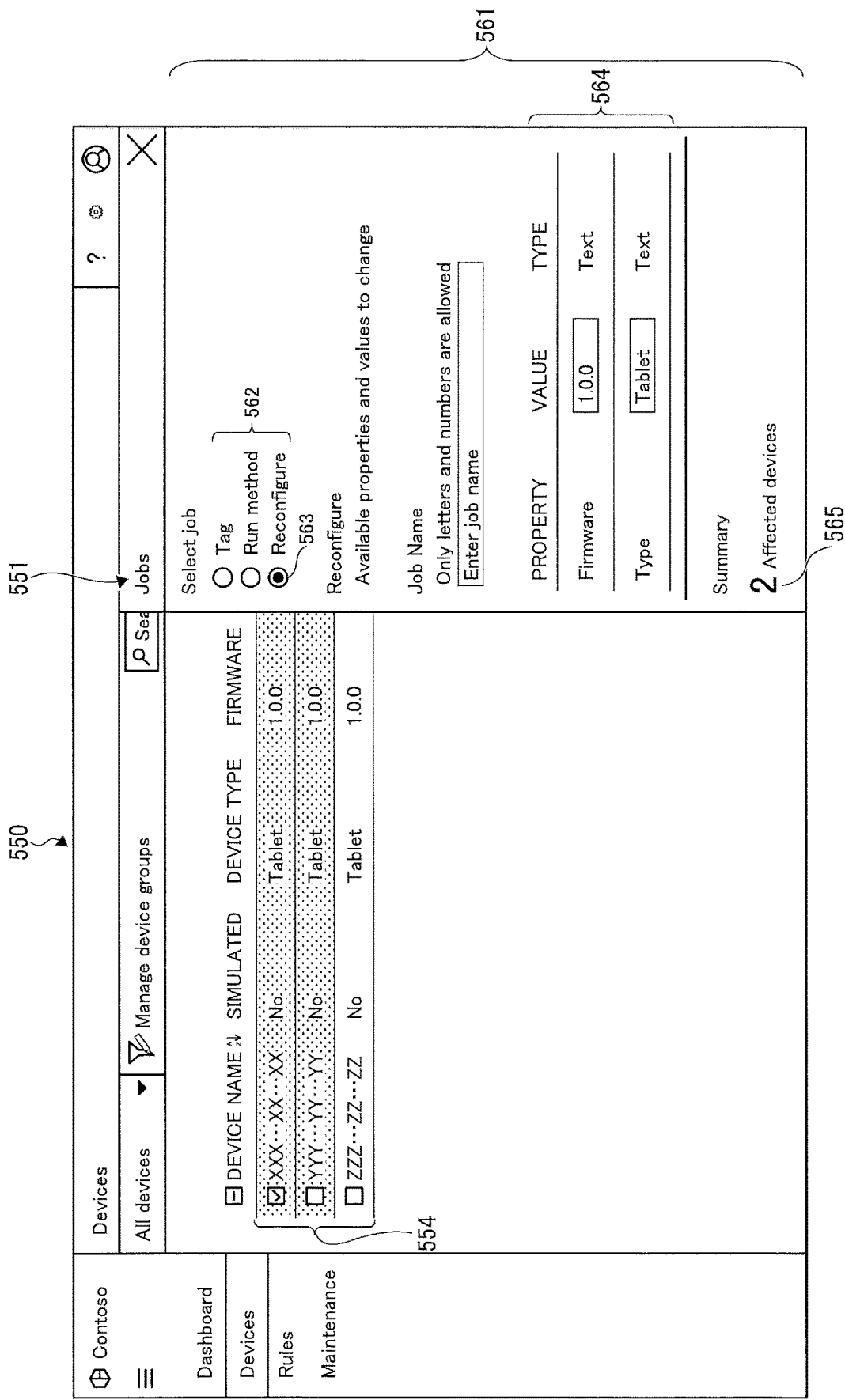
FIG. 12 is an example of the remote setting screen in which a jobs button is pressed and a menu for transmitting settings is displayed, according to an embodiment of the present disclosure.

FIG. 12 is an example of the remote setting screen in which the jobs button 551 is pressed and a menu for transmitting settings is displayed. In a menu 561 in FIG. 12, radio buttons 563 are associated with each job in a job type field 562, and "Reconfigure" is selected in FIG. 12. Reconfigure means changing a setting. The menu 561 includes a setting information acceptance field 564 for accepting setting information, and the setting information in the setting information acceptance field 564 can be transmitted to the meeting room terminal 90.

The administrator selects, from the device name list 554, the meeting room terminal 90 to which the setting information is transmitted. With this, the menu 561 displays a number 565 of the meeting room terminals 90 selected in the device name list. When the user presses an execute button, the operation acceptor 52 accepts the press, and the communicator 51 of the registration terminal 50 transmits the setting information in the setting information acceptance field 564 to the meeting room terminal 90 via the management apparatus 110 and the bidirectional communication apparatus 130.

The setting information in the setting information acceptance field 564 can be input by the administrator or may be acquired (loaded) from the meeting room terminal 90. Therefore, the administrator can create the meeting room terminal 90 having the same setting information with a simple operation.

In Case of Breakdown or Replacement of Meeting Room Terminal:

When the meeting room terminal 90 breaks down or is replaced, the CE brings the new meeting room terminal 90 to the customer side in which there is the meeting room, and performs the installation and registration to the management apparatus 110 that have been described with reference to FIG. 9.

Next, the CE contacts the administrator. The administrator activates the newly established meeting room terminal 90 by the process that has been described with reference to FIG. 10. In other words, if the registration terminal 50 can acquire the setting information from the broken meeting room terminal 90, the same setting information is set in the newly installed meeting room terminal 90. When it is difficult to acquire the setting information from the broken meeting room terminal 90, the administrator manually configures the setting info nation and sets the setting information in the meeting room terminal 90. The setting information of the meeting room terminal 90 is managed by the meeting management server 30, and the administrator can check and save the setting information on the management screen described later.

In addition, the administrator inactivates the old broken meeting room terminal 90. Inactivation means that the meeting management server 30 and the meeting room terminal 90 do not communicate with each other. For example, the manager deletes the meeting room ID stored in the storage unit 99 from the remote setting screen 550. Alternatively, the information required for communication such as the authentication key and server URL may be deleted.

Management of Setting Info nation in the Meeting Management Server:

The meeting management server 30 manages the setting information of each meeting room terminal 90, and the administrator can refer to the setting information to be set to the meeting room terminal 90 in a browser and can download the setting information.

FIG. 13 is an example of a setting screen 501 that the registration terminal 50 displays by communicating with the meeting management server 30. The setting screen 501 displays each column of a check mark field 502, a meeting room name field 503, a meeting room ID field 504, a connection state field 505 of the meeting room terminal 90, an operation group field 506, an image code field 507, and a terminal number field 508. The content of the column is the information stored in the meeting room setting information DB 498 in Table 9 except for the operation group. The operation group is a group that defines the operation policy of the meeting room. There are meeting rooms for general employees, meeting rooms for executives, reception rooms, training rooms, and the like and there are cases where the operation policy is desired to be changed by a group. For example, in a general meeting room, the meeting start time may be set as an automatic canceling timing; however, in the reception room, there are cases such as where the automatic canceling timing is desired to be delayed in consideration of the possibility of delay of visitors. In addition, there are cases where a remind timing is desired to be different between the training room (the remind timing is desired to be advanced for the preparation for a training) and the general meeting room.

The check mark field 502 corresponds to the management start flag in the meeting room setting information DB 498 in Table 9. The check mark field 502 is an acceptance button for accepting the setting for requesting the start of management of the meeting room. Checked is True and unchecked is False.

The image code field 507 can accept the pressing of the administrator. When the administrator presses the image code field 507 of any meeting room, the operation acceptor 52 of the registration terminal 50 accepts the pressing, and the registration terminal 50 requests an image code (for example, a quick response (QR) code (registered trademark)) from the meeting management server 30. With this, the communicator 51 can receive the meeting room ID, authentication key, server URL, and image code containing a meeting room name, that are stored (are to be stored) in the storage unit 99. When the new meeting room terminal 90 captures the image code, information required for communication can be stored in the storage unit 99 and communication with the meeting management server 30 can be started.

The administrator can arbitrarily set the number of terminals that can be registered in the terminal number field 508. However, since at least one meeting room terminal 90 may be located in a meeting room, the setting screen 501 should not accept 0 (zero). The terminal number field 508 accepts input (setting) of a maximum number of the meeting room terminals 90 that can be registered in one meeting room.

Therefore, in the resource reservation system 100 of this embodiment, the user or administrator of the resource reservation system (or the owner of the meeting room terminal 90) simply installs the application (e.g., the backend application) in the meeting room terminal 90. This makes it easy to perform a preparatory work such as setting up the connection between the application and server. In addition, after installation, the administrator or the like can remotely control and set other applications of the meeting room terminal 90 from the management apparatus 110 via the application or the like. Therefore, an individual setting work for respective applications can be facilitated. For example, if the meeting room information terminal breaks down and is not able to be used, the other application settings can be restored remotely, the user workload can be reduced. Furthermore, since an environment in which the latest settings for respective applications can be performed remotely can be constructed, it is possible to constantly provide a latest service without the user of the resource reservation system 100 performing respective settings.

Embodiment 2

In Embodiment 1, the description given heretofore is of a case in which the backend application 90b, the terminal application 90a, and the electronic whiteboard application 90c are installed as separate applications in the meeting room terminal 90. In the present embodiment, a case in which the backend application 90b, the terminal application 90a, and the electronic whiteboard application 90c are installed in the meeting room terminal 90 as one application will be described. This application is referred to as an integrated application.

Figure 14:
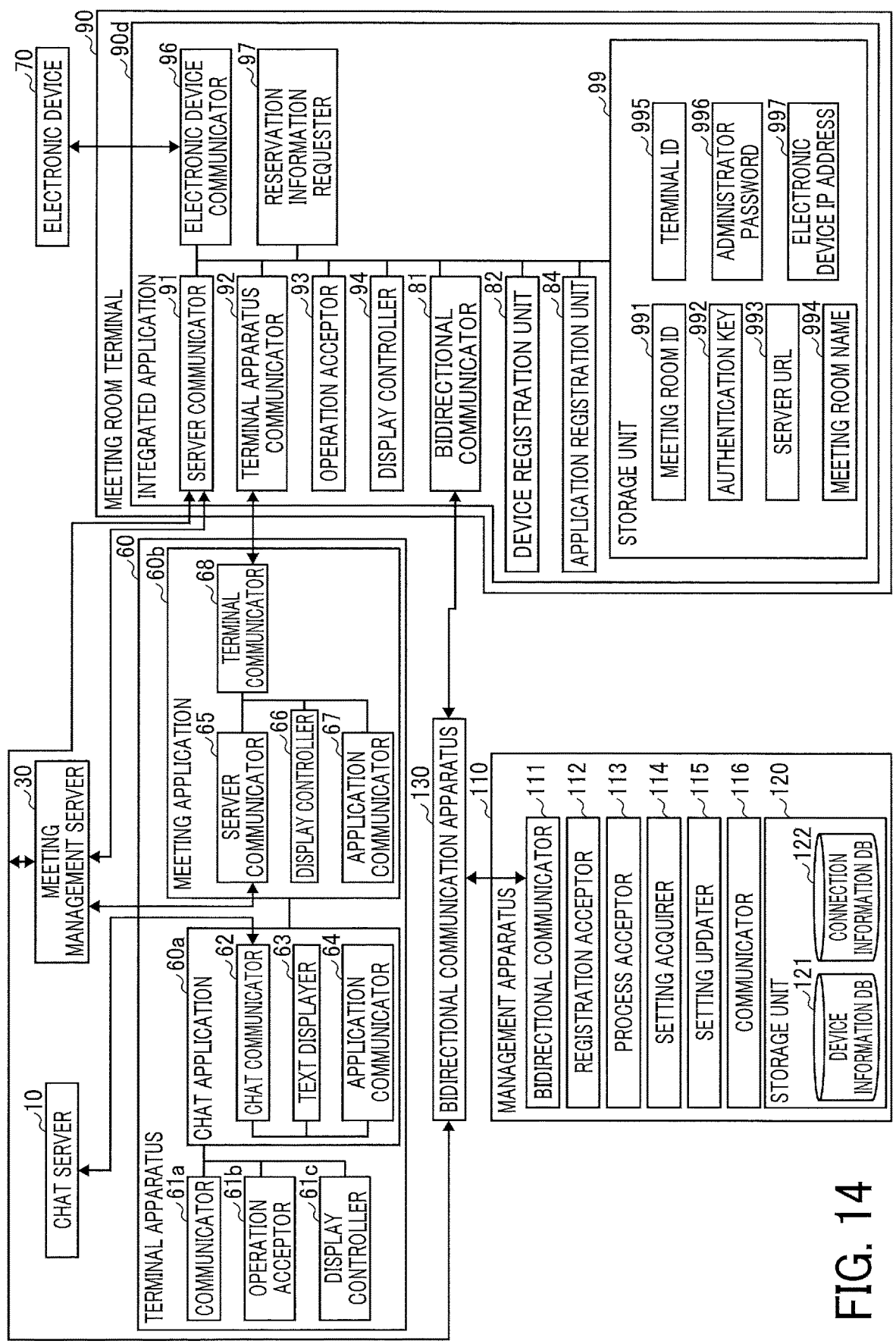
FIG. 14 is a block diagram illustrating an example of a functional configuration of the meeting room terminal, according to an embodiment (Embodiment 2) of the present disclosure.

FIG. 14 illustrates a functional block diagram of an example of the meeting room terminal 90 of this embodiment. With reference to FIG. 14, a difference from FIG. 7 will be mainly explained. An integrated application 90d is installed in the meeting room terminal 90 of FIG. 14. The integrated application 90d does not require communication between applications, and thus the in-terminal communicators 83 and 95 are omitted. In addition, since the server communicator 91 can be used, the communicator 85 is also not required.

Figure 15:
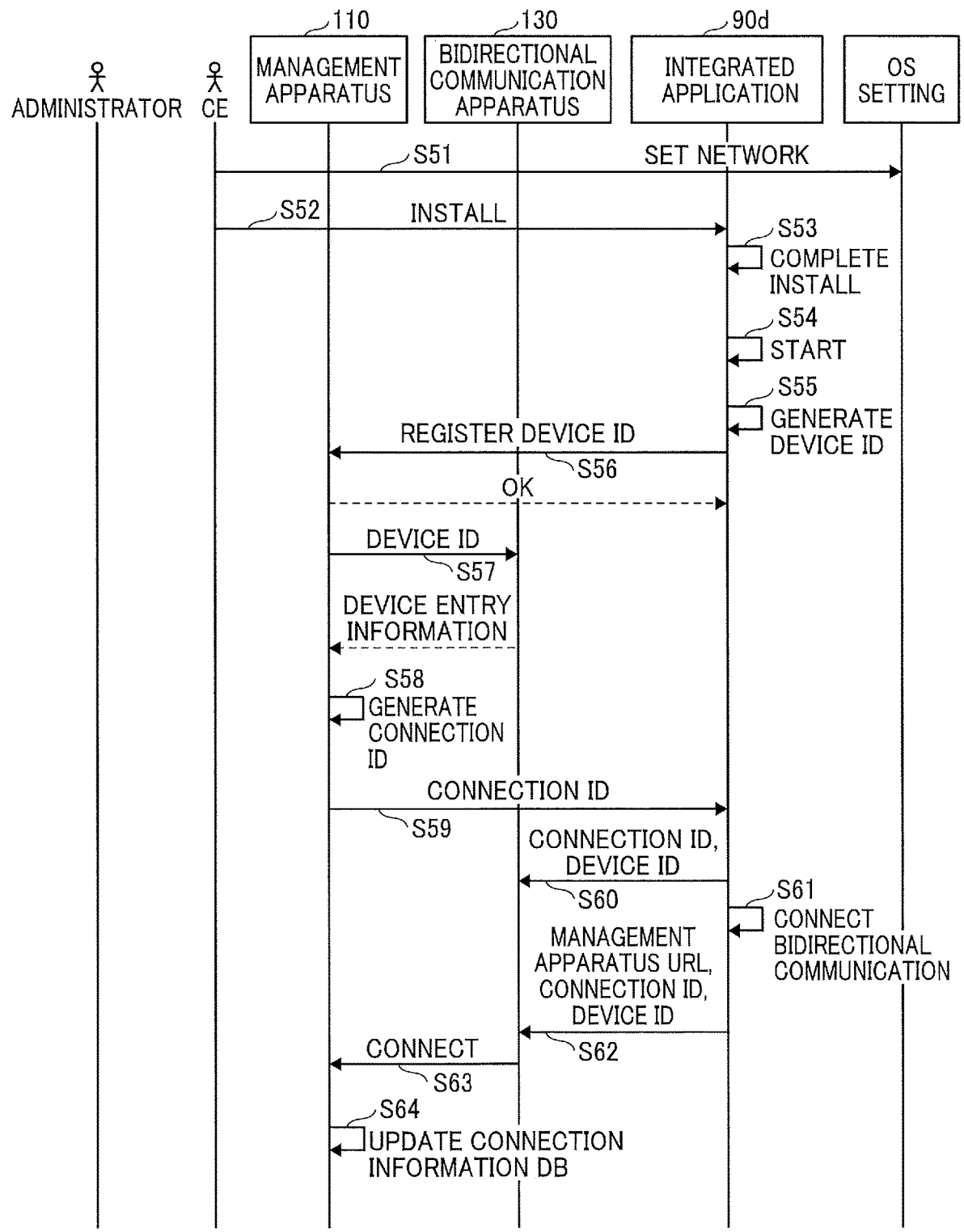
FIG. 15 is a sequence diagram illustrating an example of a procedure by which an integrated application installed in the meeting room terminal registers in the management apparatus the meeting room terminal and an application installed in the meeting room terminal, according to an embodiment (Embodiment 2) of the present disclosure.

Automatic Registration of Meeting Room Terminal:

FIG. 15 is a sequence diagram illustrating an example of a procedure by which the integrated application 90d installed in the meeting room terminal 90 registers, in the management apparatus 110, the meeting room terminal 90 and the application installed in the meeting room terminal 90. The overall flow is the same as FIG. 9 except that the integrated application 90d simply performs the process of the backend application 90b in FIG. 9.

S51: First, the CE operates the OS of the meeting room terminal 90 to set the network. In other words, the CE sets an SSID and an SSID password.

S52: Next, the CE downloads the integrated application 90d from the application distribution site and installs the backend application 90b on the meeting room terminal 90. The system user, or the owner or administrator of the terminal may perform the settings and installation operations.

S53, S54: Installation is completed. The backend application 90b after installation is automatically started, or may be started by the CE.

S55: When installed, the device registration unit 82 of the integrated application 90d starts automatic registration of the meeting room terminal 90 to the management apparatus 110. In addition, the device registration unit 82 detects the installed application from the OS or the like. The device registration unit 82 generates a device ID that does not overlap. The device ID may be generated by the management apparatus 110.

S56: The device registration unit 82 specifies the device ID and requests the bidirectional communication apparatus 130 to register. The bidirectional communication apparatus 130 registers the device ID when receiving the device ID, and returns OK.

S57 to S60: A process similar to steps S7 to S10 in FIG. 9 is performed.

S61: When registration of the device information is completed, the bidirectional communicator 81 of the integrated application 90d starts bidirectional communication.

S62: The bidirectional communicator 81 of the integrated application 90d specifies the URL, connection ID, and device ID of the management apparatus 110 and requests the bidirectional communication apparatus 130 to connect to the management apparatus 110.

S63: The bidirectional communication apparatus 130 authenticates the combination of the connection ID and device ID, and if the authentication is successful, connects to a URL of the management apparatus 110.

S64: The bidirectional communicator 111 of the management apparatus 110 receives the device ID, and updates the connection state associated with the device ID in the connection information DB 122 to "connected". With the above, the management apparatus 110 and the meeting room terminal 90 (the integrated application 90d) are connected.

The procedure for the administrator to set the setting information from the management apparatus 110 to the integrated application 90d may be the same as the procedure in FIG. 10 of Embodiment 1. In this manner, even if the backend application 90*b* is incorporated in the integrated application 90*d* in the meeting room terminal 90, the administrator can switch the meeting room terminal 90 by remote control, for example.

Embodiment 3

In this embodiment, the process in which the meeting management server 30 operates the application of the meeting room terminal 90 with the use of the bidirectional communication apparatus 130 on the basis of the configuration of Embodiment 1 or 2 will be described. Although the following description is made on the basis of the configuration of Embodiment 1, the same process can be performed with the configuration of Embodiment 2.

Figure 16:
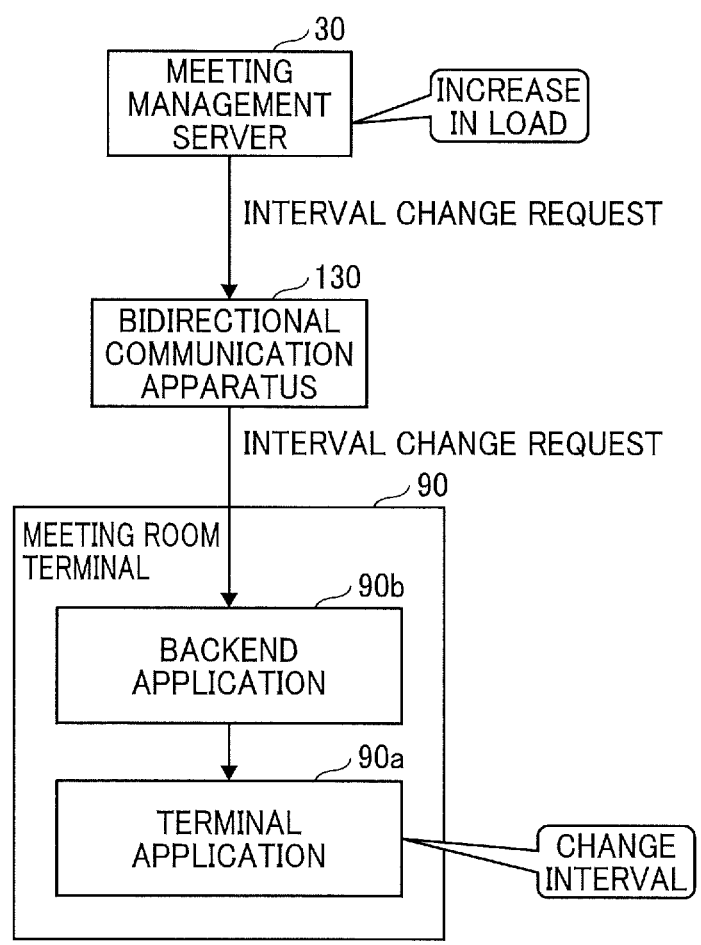
FIG. 16 is a diagram for explaining an overview of a procedure by which the meeting management server requests the meeting room terminal to perform a process, according to an embodiment of the present disclosure.

FIG. 16 is a diagram explaining an outline of a procedure by which the meeting management server 30 requests the meeting room terminal 90 to perform a process. Although a firewall makes it difficult for the meeting management server 30 on a cloud to transmit information to the meeting room terminal 90 that resides in a on-premises network, there are many cases where the meeting management server 30 wants to transmit information to the meeting room terminal 90 in real time. In this embodiment, the meeting management server 30 can transmit information to the meeting room terminal 90 in real time with the use of the bidirectional communication apparatus 130.

For example, if the load on the meeting management server 30 increases, the frequency of requesting the reservation information from the meeting room terminal 90 is desired to be reduced. The meeting management server 30 transmits, to the bidirectional communication apparatus 130, a request for changing an interval at which the meeting room terminal 90 requests the reservation information. Since the bidirectional communication apparatus 130 transmits the interval change request to the terminal application 90*a* via the backend application 90*b*, the interval at which the terminal application 90*a* requests the reservation information can be changed.

Connection Procedure:

FIG. 17 is an example sequence diagram illustrating a procedure by which the backend application 90*b* and the meeting management server 30 connect via the bidirectional communication apparatus 130.

S71: The device communicator 39 of the meeting management server 30 requests the device information from the management apparatus 110. The device information is information for the meeting management server 30 to communicate with the meeting room terminal 90, and is stored in the device information DB 121. In the process of FIG. 17, at least the device ID is acquired. The connection information may also be acquired.

S72: The device communicator 39 instructs a communication protocol and a connection process to generate a service client, and the service client specifies the device ID and requests connection to the bidirectional communication apparatus 130. The device ID stored in the device information DB 121 may be specified.

S73: Similarly, the bidirectional communicator 81 of the backend application 90*b* instructs a communication protocol and a connection process to generate a device client, and the device client specifies the device ID and requests connection to the bidirectional communication apparatus 130.

The bidirectional communication apparatus 130 associates the meeting management server 30 and the backend application 90*b* with the device ID. Thus, the backend application 90*b* and the meeting management server 30 connect via the bidirectional communication apparatus 130. With the use of not just the device ID but also the connection ID, the bidirectional communication apparatus 130 authenticates the combination of the device ID and the connection ID and then connects, and thus security can thereby be enhanced.

Since the meeting management server 30 and the meeting room terminal 90 are connected to the bidirectional communication apparatus 130, the meeting management server 30 can acquire the meeting room ID from the meeting room terminal 90. Since the device ID is specified during communication, the meeting management server 30 can store the meeting room ID and the device ID in association with each other.

FIG. 18 is an example of an association table of the meeting room ID and the device ID stored in the meeting management server 30. In the association table, the device ID is associated with the device ID. The association table is stored in the storage unit 49 (an example of association information). If there is a meeting room for which a setting is desired to be checked or changed, the meeting management server 30 searches the association table by the meeting room ID and can specify the device ID. With this, the meeting management server 30 can specify the device ID to communicate with the meeting room terminal 90 located in any meeting room via the bidirectional communication apparatus 130.

Instruction Execution Procedure:

FIG. 19 is an example sequence diagram illustrating a procedure by which the meeting management server 30 causes the terminal application 90*a* to execute an instruction by a direct method. The direct method is a mechanism that calls a method on the application side of the meeting room terminal 90 from the server side and performs some process when the application side and the server side are connected. For example, the direct method is used when the meeting management server 30 (or management apparatus 110) controls the backend application 90*b* to start/stop/function execution/front display or screen transition of each application via the bidirectional communication apparatus 130.

S81: The bidirectional communicator 81 of the backend application 90*b* transmits a direct method subscription to the bidirectional communication apparatus 130. The backend application 90*b* notifies the bidirectional communication apparatus 130 that a direct method is to be accepted by the direct method subscription.

S82: The device communicator 39 of the meeting management server 30 specifies the device ID and a method name, and transmits a method call to the bidirectional communication apparatus 130. This device ID is, in the association table in FIG. 18, the device ID of the meeting room terminal 90 (backend application 90*b*) associated with the meeting room that the meeting management server 30 desires to communicate with.

S83: The bidirectional communication apparatus 130 receives the method call, and requests the backend application 90*b* specified by the device ID to execute the method. Not just the device ID but also the connection ID should be received from the meeting management server 30 and authenticated.

S84: The backend application 90*b* requests the terminal application 90*a* to execute the method by the OS broadcast.

S85: The terminal application 90*a* receives the method request and executes the specified method. A response (OK, NG) is transmitted to the meeting management server 30 via the backend application 90*b* and the bidirectional communication apparatus 130.

Figure 20:
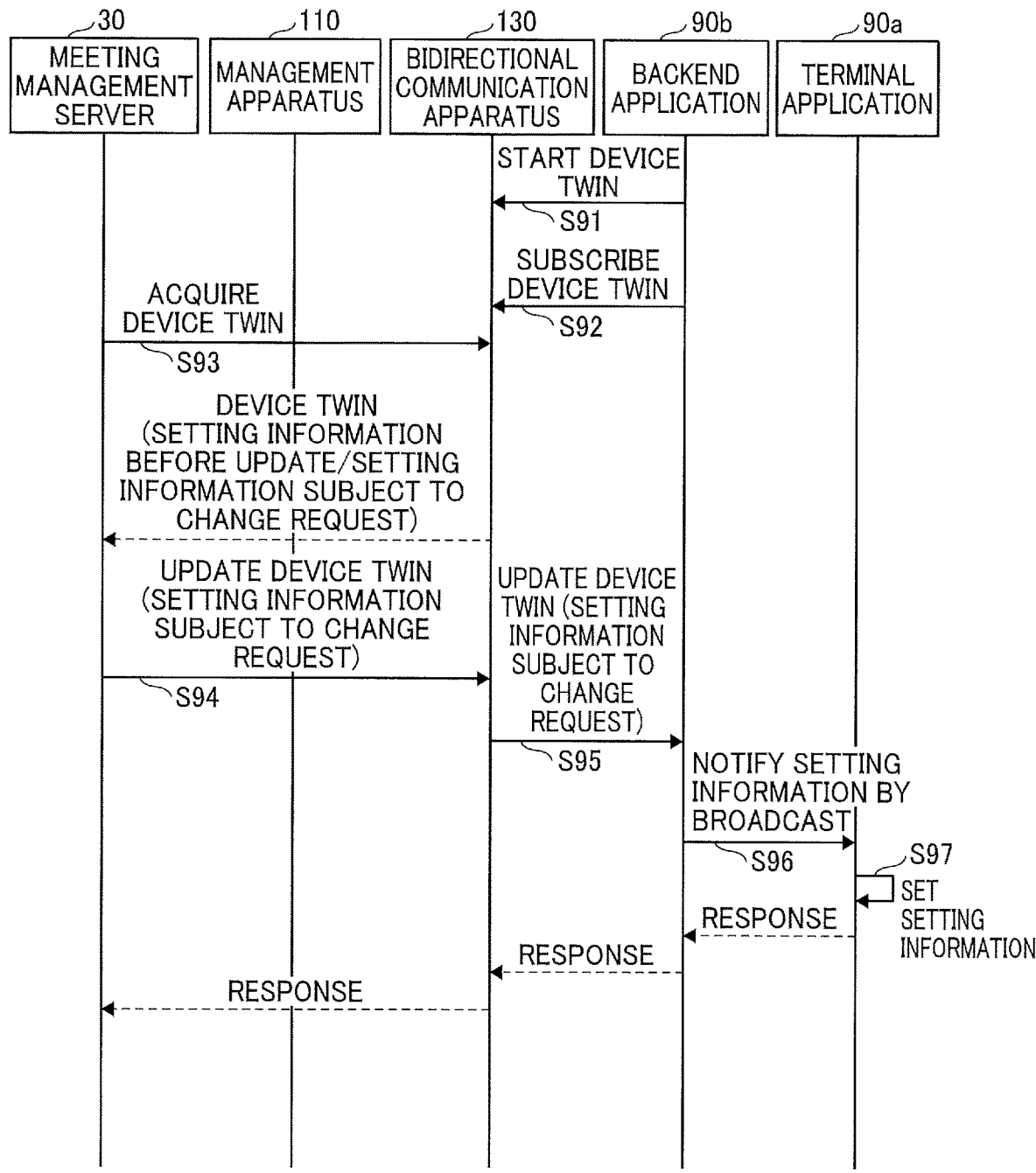
FIG. 20 is a sequence diagram illustrating an example of a procedure by which the meeting management server transmits the setting information to the terminal application by a method called device twin, according to an embodiment of the present disclosure.

FIG. 20 is an example sequence diagram illustrating a procedure by which the meeting management server 30 transmits the setting information to the terminal application 90*a* by a method called device twin. The device twin is a mechanism that reflects the setting in the application of the meeting room terminal 90, or that the server acquires some state from the application of the meeting room terminal 90. For example, the device twin is used when the meeting management server 30 (or the management apparatus 110) performs various settings such as display priority of each application, to the backend application 90*b*, or causes the backend application 90*b* to acquire a state such as start/stop, via the bidirectional communication apparatus 130.

The device twin includes a required property and a reported property. The required property is used with the reported property to synchronize the configuration and state of the meeting room terminal 90. In the embodiment, the required property is used to store the setting information. The reported property is used together with the required property to synchronize the configuration and state of the meeting room terminal 90. In the embodiment, the reported property is used to update the setting information.

S91: The bidirectional communicator 81 of the backend application 90*b* transmits a device twin start to the bidirectional communication apparatus 130. The device start means registering the required property and the reported property.

S92: The bidirectional communicator 81 of the backend application 90*b* transmits a device twin subscription to the bidirectional communication apparatus 130. The device twin subscription means notifying that the device twin is to be received.

S93: The device communicator 39 of the meeting management server 30 specifies the device ID to acquire the device twin from the bidirectional communication apparatus 130. With this, the required property (setting information before the update) and the reported property (setting information subject to a change request) included in the device twin is acquired. The specified device ID is, in the association table in FIG. 18, the device ID of the meeting room terminal 90 (backend application 90*b*) associated with the meeting room, that the meeting management server 30 desires to communicate with. When specifying an application, an application ID is also transmitted.

S94: The device communicator 39 of the meeting management server 30 specifies the device ID and the setting information subject to the change request, and requests the bidirectional communication apparatus 130 to update the device twin. Not just the device ID but also the connection ID should be received from the meeting management server 30 and authenticated.

S95: The bidirectional communication apparatus 130 specifies the setting information subject to the change request and requests the backend application 90*b* specified by the device ID to update the device twin.

S96: The bidirectional communicator 81 of the backend application 90*b* receives the device twin update request, and the backend application 90*b* transmits the setting information to the terminal application 90*a* by the OS broadcast.

S97: The terminal application 90*a* receives the setting information and sets the setting information. A response (OK, NG) is transmitted to the meeting management server 30 via the backend application 90*b* and the bidirectional communication apparatus 130.

According to the conventional art, a task of registering an information processing terminal in a management apparatus was complicated. In other words, when an administrator configures various settings for the information processing terminal in which a program is installed, it may be first required to register the information processing terminals in the management apparatus.

As described above, the meeting management server 30 according to this example can cause the meeting room terminal 90 to execute a process and can transmit the setting information from the cloud side.

According to one or more embodiments of the present disclosure, a communication system is provided that registers an information processing terminal in a management apparatus in a simple manner.

Variations:

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Further, in the present embodiment, the description heretofore is of an example case in which the meeting management server 30, the management apparatus 110, and the bidirectional communication apparatus 130 resides in the cloud network. Alternatively, the meeting management server 30, the management apparatus 110, and the bidirectional communication apparatus 130 can reside in the on-premises network.

In addition, the resource reservation system 100 can include a plurality of meeting management servers 30. The meeting management server 30 can be configured as a plurality of servers to which divided functions are arbitrary allocated. The reservation management server 20 and the meeting management server 30 can be implemented by a single entity.

Furthermore, the resource reservation system 100 of this embodiment can also be referred to as a Web service. The Web service is a variety of services provided by applying Internet-related technology. A meeting room rental service and various rental services can be given as examples. A system using the Web service is called a utilization system.

In addition, the functional configuration of the resource reservation system 100 are divided into the functional blocks as illustrated in FIG. 6 and FIG. 7, for example, based on main functions thereof, in order to facilitate understanding the processes performed by the resource reservation system 100. No limitation is intended by how the processes are divided or by the name of the processes. The resource reservation system 100 can also be divided into more processing units according to the processing contents. Further, one process can be divided to include a larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The device registration unit 82 is an example of registration means, the registration acceptor 112 is an example of registration accepting means, the process acceptor 113 is an example of process accepting means, the communicator 116 is an example of transmission means, the communicator 51 is an example of reception means, the display controller 53 is an example of display control means, and the application registration unit 84 is an example of application registration means.

What is claimed is:

1. A communication system comprising:
   an information processing terminal; and a management apparatus communicable with the information processing terminal via a bidirectional communication apparatus,
   the information processing terminal including one or more first processors configured to execute an application installed in the information processing terminal, to transmit, to the management apparatus, communication information which the management apparatus uses to communicate with the information processing terminal, in response to installation of the application in the information processing terminal,
   the management apparatus including one or more second processors configured to register, in the bidirectional communication apparatus, the communication information received from the information processing terminal,
   wherein the information processing terminal and the management apparatus bidirectionally communicate via the bidirectional communication apparatus by using the communication information;
   wherein the application configures the one or more first processors to transmit, to the management apparatus, information regarding the application installed in the information processing terminal,
   wherein the one or more second processors are further configured to register the information regarding the application in association with the information processing terminal,
   wherein the management apparatus communicates with the information processing terminal via the bidirectional communication apparatus by specifying the information regarding the application,
   wherein the management apparatus:
     transmits a request for setting information that the application includes to the information processing terminal via the bidirectional communication apparatus by specifying the information regarding the application; and
     receives the setting information that the application includes from the information processing terminal via the bidirectional communication apparatus,
   wherein the one or more second processors of the management apparatus are further configured to:
     generate screen information of a remote setting screen displaying the setting information and accepting an operation on the setting information that the information processing terminal includes; and
     transmit the screen information to a terminal apparatus, which is an apparatus operated by a user, and
   wherein the terminal apparatus includes one or more third processors configured to:
     receive the screen information; and
     display the remote setting screen on a display based on the screen information received,
   wherein the information processing terminal is a meeting room terminal provided in each meeting room,
   wherein the application is installed on the meeting room terminal, and
   wherein the application:
     accepts a setting or a control for a different application installed in the meeting room terminal, via the bidirectional communication apparatus, in response to an input on a remote setting screen that accepts an operation on setting information stored in the information processing terminal, the remote setting screen being provided by the management apparatus to the terminal apparatus operated by a user; and
     executes the setting or the control for the different application accepted, and
   wherein the different application includes a meeting application used in the meeting room terminal.

2. The communication system according to claim 1, wherein
   the management apparatus:
     transmits the setting information to the information processing terminal via the bidirectional communication apparatus by specifying the information regarding the application, to request the information processing terminal to update the setting information set in the application.

3. The communication system according to claim 1,
   wherein the one or more first processors of the information processing terminal are further configured to transmit, each time an application is installed in the information processing terminal, information regarding the application installed in the management apparatus, and
   wherein the one or more second processors of the management apparatus are further configured to register the information regarding the application transmitted from the information processing terminal in association with the information processing terminal.

4. The communication system according to claim 1, further comprising an information processing apparatus communicable with the information processing terminal via a network,
   wherein the information processing apparatus stores information associating the information processing terminal with a resource to be reserved, and
   wherein the information processing apparatus:
     acquires, from the management apparatus, the communication information of each information processing terminal;
     connects to the information processing terminal via the bidirectional communication apparatus by using the communication information to acquire resource identification information stored in the information processing terminal; and
     generates association information associating the communication information of each information processing terminal with the resource identification information.

5. The communication system according to claim 4, wherein
   the information processing apparatus uses the communication information of each information processing terminal associated with the resource identification information in the association information, to request, via the bidirectional communication apparatus, the information processing terminal to execute an instruction or to update setting information stored in the information processing terminal.

6. The communication system according to claim 1,
wherein, the application configures the one or more first processors to generate identification information identifying the information processing terminal as one of the communication information in response to installation of the application and to transmit the identification information to the management apparatus,
wherein the one or more second processors of the management apparatus:
  transmit the identification information to the bidirectional communication apparatus;
  generate connection information as one of the communication information; and
  transmit the connection information to the information processing terminal, and
wherein the application configures the one or more first processors to transmit the connection information to the bidirectional communication apparatus.

7. The communication system according to claim 1,
wherein the meeting application includes:
  an acceptance application accepting a start of use of a meeting room; and
  an information collection application collecting information during a meeting after the start of use of the meeting room, and
wherein the information collection application includes a handwriting application or a recording application.

8. The communication system according to claim 7,
wherein the setting includes a setting relating to display of the different application, and
wherein, the setting relating to the display causes the acceptance application to be displayed on a foreground of the meeting room terminal until accepting the start of use of the meeting room, and causes the information collection application to be displayed on the foreground after accepting the start of use of the meeting room.

9. The communication system according to claim 1,
wherein
  the control is start and stop of the different application or collection of information on state information.

10. The communication system according to claim 1,
wherein, in response to the management apparatus receiving, from a user, an operation for accessing information in the information processing terminal,
  the one or more second processors of the management apparatus issue a connection request together with the communication information received from the information processing terminal, to the bidirectional communication apparatus;
  in response to receiving the connection request with the communication information from the management apparatus, the bidirectional communication apparatus performs authentication by checking whether the communication information is registered in the bidirectional communication apparatus; and
  in response to the authentication being successful,
    the one or more second processors of the management apparatus issue an access request, with the communication information, to the bidirectional communication apparatus,
    the bidirectional communication apparatus issues the access request to the information processing terminal specified by the communication information, and
    in response to receiving the access request from the bidirectional communication apparatus, the one or more first processors of the information processing terminal return a response to the management apparatus via the bidirectional communication apparatus.

11. A communication method performed by a communication system comprising an information processing terminal and a management apparatus communicable with the information processing terminal via a bidirectional communication apparatus, the communication method comprising:
  by an application installed in the information processing terminal, transmitting, to the management apparatus, communication information which the management apparatus uses to communicate with the information processing terminal, in response to installation of the application in the information processing terminal;
  by the management apparatus, registering the communication information received from the information processing terminal in the bidirectional communication apparatus;
wherein the information processing terminal and the management apparatus bidirectionally communicate via the bidirectional communication apparatus by using the communication information,
wherein the method further comprises:
  by the application, transmitting, to the management apparatus, information regarding the application installed in the information processing terminal,
  by the management apparatus, registering the information regarding the application in association with the information processing terminal,
  by the management apparatus, communicating with the information processing terminal via the bidirectional communication apparatus by specifying the information regarding the application,
  by the management apparatus, transmitting a request for setting information that the application includes to the information processing terminal via the bidirectional communication apparatus by specifying the information regarding the application;
  by the management apparatus, receiving the setting information that the application includes from the information processing terminal via the bidirectional communication apparatus,
  by the management apparatus, generating screen information of a remote setting screen displaying the setting information and accepting an operation on the setting information that the information processing terminal includes; and
  by the management apparatus, transmitting the screen information to a terminal apparatus, which is an apparatus operated by a user,
wherein the method further comprises:
  by the terminal apparatus, receiving the screen information; and
  by the terminal apparatus, displaying the remote setting screen on a display based on the screen information received,
wherein the information processing terminal is a meeting room terminal provided in each meeting room,
wherein the application is installed on the meeting room terminal,
wherein the method further comprises:
  by the application, accepting a setting or a control for a different application installed in the meeting room terminal, via the bidirectional communication apparatus, in response to an input on a remote setting screen that accepts an operation on setting information stored in the information processing terminal, the remote setting screen being provided by the management apparatus to the terminal apparatus operated by a user; and by the application, executing the setting or the control for the different application accepted, and wherein the different application includes a meeting application used in the meeting room terminal.

* * * * *